US010124354B2

(12) United States Patent
Verpoort et al.

(10) Patent No.: US 10,124,354 B2
(45) Date of Patent: Nov. 13, 2018

(54) PLASMA NOZZLE FOR THERMAL SPRAYING USING A CONSUMABLE WIRE

(71) Applicant: FORD GLOBAL TECHNOLOGIES, LLC, Dearborn, MI (US)

(72) Inventors: Clemens Maria Verpoort, Monheim (DE); Leander Schramm, Remda-Teichel (DE); Enrico Hauser, Langenbach (DE)

(73) Assignee: Ford Global Technologies, LLC, Dearbron, MI (US)

( * ) Notice: Subject to any disclaimer, the term of this patent is extended or adjusted under 35 U.S.C. 154(b) by 570 days.

(21) Appl. No.: 14/759,258

(22) PCT Filed: Dec. 18, 2013

(86) PCT No.: PCT/EP2013/077037
§ 371 (c)(1),
(2) Date: Jul. 6, 2015

(87) PCT Pub. No.: WO2014/106577
PCT Pub. Date: Jul. 10, 2014

(65) Prior Publication Data
US 2016/0001309 A1 Jan. 7, 2016

(30) Foreign Application Priority Data
Jan. 4, 2013 (DE) ........................ 10 2013 200 062

(51) Int. Cl.
*B05B 7/22* (2006.01)
*H05H 1/34* (2006.01)
(Continued)

(52) U.S. Cl.
CPC .......... *B05B 7/224* (2013.01); *B05B 13/0636* (2013.01); *C23C 4/131* (2016.01);
(Continued)

(58) Field of Classification Search
CPC ..... B05B 13/0636; B05B 7/224; C23C 4/131; H05H 1/34; H05H 1/3405; H05H 1/42
See application file for complete search history.

(56) References Cited

U.S. PATENT DOCUMENTS 2,982,845 A     5/1961  Yenni et al.
5,808,270 A  *  9/1998  Marantz ................. B05B 7/224
                                              219/121.47
(Continued)

FOREIGN PATENT DOCUMENTS

CH    314014 A    5/1956
DE    943268 C   11/1956
(Continued)

OTHER PUBLICATIONS

International Search Report for corresponding PCT/EP2013/077037 filed Dec. 18, 2013, 11 pages.

*Primary Examiner* — Geoffrey S Evans
(74) *Attorney, Agent, or Firm* — Marla Johnston; Brooks Kushman P.C.

(57) ABSTRACT

The invention relates to a device for thermally coating a surface, which has at least one housing (6), a cathode (9), a primary gas distributor (11), a secondary gas distributor (12), electrically and thermally acting insulation elements (13, 14, 16), and an anode, which is designed as a consumable wire and is guided into a nozzle (19, 21) by means of a wire guide (18), wherein the nozzle (19, 21) is mounted in a centered manner and has openings (23) arranged radially in one plane on one of its sides (22).

18 Claims, 23 Drawing Sheets

(51) Int. Cl.
  *H05H 1/42* (2006.01)
  *B05B 13/06* (2006.01)
  *C23C 4/131* (2016.01)
(52) U.S. Cl.
  CPC ............ *H05H 1/34* (2013.01); *H05H 1/3405* (2013.01); *H05H 1/42* (2013.01); *H05H 2001/3447* (2013.01); *H05H 2001/3468* (2013.01)

(56) References Cited

U.S. PATENT DOCUMENTS

| | | | | |
|---|---|---|---|---|
| 5,938,944 A | * | 8/1999 | Baughman | ............ B05B 7/224 219/121.47 |
| 5,951,883 A | * | 9/1999 | Barbulescu | ............ B23H 7/265 219/69.15 |
| 5,963,579 A | * | 10/1999 | Henryon | ............ B22D 41/015 266/229 |
| 6,372,298 B1 | * | 4/2002 | Marantz | ................. B05B 7/224 219/121.5 |
| 6,610,959 B2 | | 8/2003 | Carlson et al. | |
| 6,706,993 B1 | | 3/2004 | Chancey | |
| 8,350,181 B2 | * | 1/2013 | Albanese | ................ B05B 7/222 219/121.45 |
| 9,056,326 B2 | | 6/2015 | Schramm et al. | |
| 2011/0042358 A1 | * | 2/2011 | Albanese | ................ B05B 7/222 219/121.5 |
| 2012/0018407 A1 | * | 1/2012 | Schramm | ................ B05B 7/224 219/76.16 |
| 2012/0160813 A1 | * | 6/2012 | Kowalsky | ............... B05B 7/224 219/121.47 |
| 2014/0166625 A1 | * | 6/2014 | Sugimoto | ............... B05B 7/224 219/76.16 |

FOREIGN PATENT DOCUMENTS

| | | |
|---|---|---|
| DE | 102008004607 A1 | 5/2009 |
| DE | 102009004581 A1 | 7/2010 |
| EP | 0994637 A2 | 4/2000 |
| EP | 2236211 A1 * | 10/2010 |
| JP | 03-012252 A * | 1/1991 |
| JP | 03-068469 A * | 3/1991 |
| JP | 09-308970 A * | 12/1997 |
| WO | 9714527 A1 | 4/1997 |

\* cited by examiner

PLASMA NOZZLE FOR THERMAL SPRAYING USING A CONSUMABLE WIRE

CROSS-REFERENCE TO RELATED APPLICATION

This application is the U.S. national phase of PCT Application No. PCT/EP2013/077037 filed on Dec. 18, 2013, which claims priority to DE Patent Application No. 10 2013 200 062.6 filed on Jan. 4, 2013, the disclosures of which are incorporated in their entirety by reference herein.

DESCRIPTION

The present invention relates to a plasma nozzle for thermal spraying using a consumable wire.

Devices for thermally coating a surface are described in U.S. Pat. Nos. 6,372,298 B1, 6,706,993 B1, 5,808,270 A and WO2010/112567 A1, for example. Devices mentioned there have the following in common: a wire feed device for feeding a consumable wire, wherein the wire acts as an electrode; a source of plasma gas for producing a plasma gas stream; a nozzle body having a nozzle opening, through which the plasma gas stream is directed as a plasma gas jet at one wire end; and a second electrode, which is arranged in the plasma gas stream before said stream enters the nozzle opening. U.S. Pat. No. 6,610,959 B2 and WO2012/95371 A1 are also concerned with devices of this kind.

An arc forms through the nozzle opening between the two electrodes. The plasma jet emerging from the nozzle opening impinges upon the wire end and there, by means of the arc, causes the wire to melt and the melted wire material to be carried away in the direction of the surface to be coated. Arranged in a ring shape around the nozzle opening are secondary air nozzles, which produce a secondary gas jet that impinges upon the material that has melted off the wire end and thus causes acceleration of transfer in the direction of the surface to be coated and secondary atomization of the melted wire material.

WO2010/112567 A1 discloses that the arc can be struck directly between the anode and the cathode, eliminating the need for a pilot arc. According to the teaching of U.S. Pat. No. 5,808,270 A (=DE 697 29 805 T2), however, a pilot arc is first of all struck between the plasma gas nozzle and the cathode. Once this arc has been struck, the arc can be transferred to the wire. Moreover, U.S. Pat. No. 5,808,270 A discloses a cathode unit which consists of a copper housing having an insert of thoriated tungsten. The cathode unit is screwed to a cathode holder. The cathode holder is then inserted into the housing in a conventional manner.

DE 10 2009 004 581 A1 discloses a spraying device for wire-arc spraying, comprising a consumable wire electrode, a non-consumable electrode, an energy source for producing and maintaining an arc between the two electrodes and a wire feed device for supplying the consumable wire electrode. It is stated that a voltage and/or a current intensity of the energy source can be monitored by means of a control unit. The control unit automatically controls the wire feed rate in accordance with the current intensity and/or the voltage of the energy source. By means of a wire straightener, the consumable electrode is straightened as it is fed into the torch in order to ensure axial alignment and precise feeding of the consumable wire electrode to the non-consumable electrode.

WO97/14527 A1 is concerned with a wire feed device, particularly for an electric arc process. WO97/14527 A1 describes a feed device which has a recirculating ball screw, the balls of which move on a helical path around the wire. Here, the rotary motion of the drive is converted into a linear motion of the wire electrode.

Modern internal combustion engines or the engine blocks thereof can be cast from a metal or a light alloy, e.g. aluminum, aluminum blocks, in particular, having an iron or metal layer on the cylinder bores thereof. The metal layer can be sprayed on by thermal processes. In addition to twin-wire arc spraying methods (TWA), HVOF spraying methods and plasma-powder spraying methods, known thermal spraying methods include plasma-wire spraying methods or PTWA (plasma transferred wire arc) methods. Coating the cylinder bores by means of plasma wire spraying methods, i.e. by PTWA, is advantageous because it is possible in this way to produce a coating which has a positive effect in terms of a reduced wear factor and a longer service life for the engine with reduced oil consumption in comparison with conventional linings provided by cast liners made of gray cast iron.

However, the known devices for thermal coating and the methods implemented with said devices have some disadvantages. For example, the known devices are fed into a cylinder bore to be coated and, in operation, rotate upon themselves while simultaneously performing a linear up and down movement. It is evident here that the process gases flowing in the cylinder bore are taken along by flat surfaces on the device, especially flat surfaces on the housing, in a manner similar to a blade during the rotation of the device, giving rise to additional turbulence.

For higher wire feed rates, correspondingly higher currents are required, and these simultaneously cause higher thermal stress on the devices. The heat input from the plasma and from the liquid spray particles causes intense heating of the surface of the bore, and very high surface temperatures occur. The heated process gases flowing out of the bore lead to additional heating of the devices. In addition to the high working temperatures, the spray dust and overspray particles also represent a problem for reliable long-term operation of the torch.

Not all the liquid spray particles adhere to the surface, the application efficiency in the bore being about 87%, and therefore very large quantities of dust are generated with correspondingly higher wire feed rates of, for example, 10 kg/h. These spray dusts are hot, pasty particles, which are deflected from the (aluminum) surface or from the already formed sprayed layers by the flowing process gases in the bore. These particles can then lead to deposits on the surface of the device, especially on the housing thereof, and these can grow into thick layers as the spraying time increases and can then flake away in an uncontrolled way as large pieces, which may then embed themselves in the functional coating or lead to a short circuit on the device. This short circuit can occur as soon as a closed, electrically conductive layer has formed on the outer surface of the device.

Moreover, the known devices are dimensioned in such a way that they can no longer coat the cylinder bores in accordance with the required parameters for success owing to the ever decreasing diameter of said bores.

Given this situation, it is the underlying object of the invention to indicate an improved device for thermally coating surfaces, by means of which internal coating, even of relatively small bore diameters of less than 60 mm, can be achieved with rotation about an internal axis while simultaneously performing a linear motion, giving a high application rate and an increased service life while simultaneously minimizing maintenance.

This object is achieved by the plasma nozzles of one or more embodiments disclosed herein. Further particularly advantageous embodiments of the invention are disclosed herein.

It is pointed out that the features specified individually in the following description may be combined with one another in any desired technically meaningful way and disclose further refinements of the invention. The description, in particular in conjunction with the figures, characterizes and specifies the invention further.

According to the invention, a device for thermally coating a surface comprises at least one housing, a cathode, a primary gas distributor, a secondary gas distributor, electrically and thermally acting insulation elements, and an anode, which is designed as a consumable wire and is guided into a nozzle by means of a wire guide, wherein the nozzle is mounted in a centered manner and has openings arranged radially in one plane on one of its sides.

The housing can be of one-part or multipart design, preferably of two-part design with at least one main element and at least one cover element, wherein the nozzle has a primary gas nozzle and a secondary gas nozzle, wherein the primary gas nozzle is mounted in a centered manner on the primary gas distributor with a secondary gas distributor connected in parallel, and has openings arranged radially in one plane on its side oriented toward the secondary gas nozzle. The openings can be embodied as slots or holes.

In an advantageous embodiment, provision can be made for the primary gas nozzle to be formed from two materials, wherein a preferably tungsten-alloyed core is preferably encapsulated with copper (copper being referred to as metallic in the sense according to the invention). It is thus possible to achieve optimized heat transfer with little expansion and high wear resistance in the vicinity of the arc by means of the tungsten-alloyed core in spite of a high thermal load. Cooling and thus constriction of the arc in the nozzle wall region can also be achieved. The primary gas nozzle can also be formed from a ceramic material.

It is also expedient for the primary gas nozzle to be isolated so as to be potential-free, ensuring that an arc is struck directly between the cathode and the anode, which is embodied as a wire. Thus, it is also possible for the primary gas nozzle to be formed from a ceramic material, ensuring that it is electrically neutral. The primary gas nozzle is also used to bundle the primary gas. It is expedient if the primary gas nozzle has a cylindrical external shape, wherein engagement elements for engagement in corresponding depressions in the primary gas distributor are arranged on the side oriented toward the primary gas distributor, thus in all cases ensuring centered installation of the two components relative to one another. The primary gas nozzle can have either a cylindrical or a divergent internal shape or a Laval contour.

Arrangement of the openings, i.e. the holes or slots, in a common radial plane in combination with the secondary gas nozzle gives rise to the formation of a secondary gas labyrinth, thus enabling the secondary gas to be used to cool the primary gas nozzle. At the same time, account is taken of the fact that the maximum thermal stress is present in the vicinity of the arc.

In order to be able to achieve the advantageous cooling of the primary gas nozzle with secondary gas, it is advantageously proposed that the number of radial openings, i.e. holes/slots, is symmetrically greater than a secondary gas hole number of secondary gas holes in the secondary gas nozzle. For example, twelve radial slots arranged in one plane can be provided in the primary gas nozzle, and it would therefore be possible to arrange just eight secondary gas holes in the secondary gas nozzle. If ten slots were provided, six secondary gas holes would be possible, for example. For distribution of the flows from the openings, i.e. from the holes/slots of the primary gas nozzle, into the holes in the secondary gas nozzle, an annular groove, the inside and outside diameter of which advantageously correspond to the resulting diameters of the secondary gas holes in the opening plane, i.e. in the slot plane, can be integrated into the primary and/or secondary gas nozzle as a further part of the labyrinth. Basically, the primary gas nozzle is centered in the primary gas distributor and centers the secondary gas nozzle.

It is also expedient according to the invention if the cathode is formed from two materials, wherein a preferably tungsten-alloyed core is preferably encapsulated with copper. This embodiment has an advantageous effect in terms of optimized power and heat transfer with, at the same time, high temperature stability and wear resistance of the tungsten-alloyed core, while a low electron work function is required.

In an expedient embodiment, the cathode is embodied in a finger shape at its preferably tungsten-alloyed core, and this, in combination with a convergent inlet zone of the primary gas nozzle, leads to a slight arc constriction, thereby allowing helpful temperature distribution in the arc starting point, this in turn being advantageous for the service life of the cathode. There is likewise no turbulence of the flow at the edges of the cathode. It is also helpful if the primary gas nozzle has an inlet zone for the primary gas which converges in a manner centered with respect to the cathode or converges divergently, thus ensuring a reduction of turbulence in the primary gas in order to achieve a less turbulent primary gas flow.

In an advantageous embodiment, the encapsulated copper jacket is of hat-type design, for example, with a sleeve portion and a flange formed integrally thereon. The finger-shaped, preferably tungsten-alloyed, core is accommodated in the sleeve portion. The finger-shaped core is characterized in that it projects beyond the sleeve portion by means of its, preferably rounded, tip. It is also possible to form at least one encircling groove in the tip region of the finger-shaped core. An external thread, which interacts with a corresponding internal thread in the housing, preferably in the cover element thereof, is arranged on the outer circumference of the sleeve portion. There is a further advantage of the invention here, in which the cathode can be screwed into the housing, preferably into the cover element. The cathode is thus advantageously arranged in a manner centered within the housing by way of the threaded portion and by means of the flange and also remains in this centered position, despite the significant action of heat during operation. The cathode can thus advantageously be connected frictionally and positively to the housing, avoiding simple nonpositive support for the cathode within the housing, ensuring that the action of heat has no deleterious effects in terms of unwanted loosening of the screwed joint and harmful thermal stresses also no longer have any effect in terms of possible displacement of the cathode. This advantage is also apparent with the components that have already been described and those which remain to be described, of which further details will be given below. It is expedient if a key surface is arranged externally on a flange portion of the copper jacket, i.e. is accessible from outside the housing. In this way, the cathode can be inspected and/or replaced simply by being unscrewed, without the need to open the entire housing.

In a preferred embodiment, the housing (of which further details will be given below) is formed from brass, thus allowing for thermal stresses and hence the strength of the threaded joint owing to the different thermal expansion coefficients of tungsten alloy/copper/brass. Sealing of the cathode relative to the housing, that is to say, for example, relative to the cover element, can be achieved by means of an O-ring between the flange and the housing. If the housing is of multipart construction, that is to say, for example, of two-part construction, the main element and the cover element are, of course, formed from brass.

In another expedient embodiment, the primary gas distributor is formed from a ceramic material and, in addition to its actual gas distribution function, thus also acts as a thermal and electrical insulator between the housing, the cathode and the primary gas nozzle. In a preferred embodiment, the primary gas distributor has convergently and/or concentrically arranged holes, which extend from a lower side to a side oriented toward the primary gas nozzle. Thus, homogeneous gas distribution and simultaneous cathode cooling by means of the primary gas are possible. With the expedient arrangement and embodiment of the holes, turbulence in the primary gas is avoidable, and this, in turn, has a positive effect in terms of reduced cathode temperature relative to turbulent primary gas. It is advantageous if a large number of holes is arranged in the primary gas distributor, it being possible to provide so many holes that the primary gas distributor can be embodied virtually as a membrane. By means of these measures, the homogeneous gas distribution can be further improved while avoiding turbulence. In contrast to the conventional vortex flows of the primary gas, the less turbulent flow of the primary gas in the regions having reductions in cross section, specifically in the region of the cathode tip and/or of the arc starting point, ensures a higher flow rate of the primary gas. The primary gas is not heated as much, and the heat is dissipated more quickly by the primary gas. With the homogeneous flow to the cathode through the convergent holes, cooling of the cathode specifically in the lower region is achieved, the aim being to reduce heat transfer to the housing. For this reason, a large annular channel for distributing the primary gas is arranged in the housing in the immediate vicinity of the fastening thread of the cathode. In an advantageous embodiment, the surface area of the cathode in the relevant cylindrical part of the cathode can be increased by grooves in the flow direction of the primary gas. In a particularly advantageous embodiment, the primary gas distributor is designed in a manner appropriate to ceramics and centers the primary gas nozzle, while itself being centered in the cover element of the housing.

It is advantageous according to the invention if the secondary gas distributor has convergently and/or concentrically arranged holes of different hole cross sections, which can thus bring about equalization of the secondary gas streams within the housing. The holes ensure favorable distribution of the secondary gas. The number of holes is preferably chosen so that it is greater than the number of openings (holes/slots) in the primary gas nozzle. In interaction with the primary gas nozzle, a further secondary gas labyrinth is thus as it were formed and, in this way, the primary gas nozzle is also well cooled on the outside. In a more preferred embodiment, the secondary gas distributor has an assembly aid, thus allowing the diameter of the holes to be oriented selectively and in accordance with the desired effect (see above). Of course, the functions of the secondary gas distributor can also be embodied as additions to the secondary gas nozzle, the primary gas distributor or the main insulator.

It is advantageous if the secondary gas nozzle is formed from a ceramic material and thermally and/or electrically insulates the housing, the cathode, the wire guide and indeed also the wire as well as, if required, the primary gas nozzle. The secondary gas nozzle has a side arranged toward the primary gas nozzle and, opposite said side, a wall portion surrounding a central opening, in which a single recess for the wire is formed. The secondary gas nozzle preferably has convergently and concentrically arranged holes, with the result that the secondary gas forms a pressure cone. Here, the arrangement of holes is advantageously symmetrical with respect to the wire feed axis. In an advantageous embodiment, the hole axes form a theoretical atomization point, although the abovementioned pressure cone is produced. This means that the secondary gas columns flowing out through the respective hole do not intersect opposite the theoretical atomization point of the hole axes but as it were form an enveloping pressure cone. In the region of the side facing the primary gas nozzle, the internal shape of the secondary gas nozzle represents an extension of the internal contour of the primary gas nozzle. The formation of a pressure cone is thus additionally assisted by the centrally flowing primary gas. From the region of the secondary gas holes to the secondary gas nozzle end, turbulence is avoided through the internal secondary gas nozzle contour for assisting pressure cone formation. The secondary gas holes are deliberately embodied in such a way that, by virtue of the hole arrangement, the hole angle and the hole diameter, the secondary gas flow through the individual holes is guided past the wire fed in and thus the pressure cone forms in a uniform manner around the melting point of the wire, behind the wire fed in. Furthermore, a vacuum zone is thus formed in the region of the wire fed in, with the result that melted particles which form on the wire from the side facing the nozzle are carried around the wire into the secondary gas flow. The effect of known devices, namely that the melt is carried into the secondary gas flow as molten droplets by the vector forces which occur in the arc starting point on the wire and the primary gas flow, around the short wire flank formed in the arc starting point, and there divides into smaller molten droplets, is additionally assisted by the uniform arrangement and formation of the pressure cone in accordance with the invention. It is furthermore ensured that even relatively small molten droplets are carried around the wire flank, even in the case of relatively long wire flanks, i.e. relatively large molten droplets are avoided and a constant stream of particles is ensured. This takes account of the fact that the spraying clearance, i.e. the clearance between the axis of rotation and the surface to be coated, is smaller especially in the case of relatively small hole diameters. Through the deliberate avoidance of flow against the wire in the region in which the wire is fed in, the possibility of molten droplets being carried on the wire in the direction of wire feed on the side facing the nozzle is furthermore avoided. In an advantageous embodiment, the number of holes and the overall cross section of the holes are matched to the secondary gas throughput in order in this way to set the speed of flow, that is to say also the particle speed, of the metal droplets carried in the direction of the surface to be coated.

It is furthermore advantageous if the secondary gas nozzle, in particular the wall portion thereof, has only a single inlet opening in the delivery direction but opposite said opening is closed, thus preventing the wire from being transported out of the device, contrary to the procedure with known devices. Apart from promoting uniform formation of the pressure cone, this enables the control and monitoring device for wire feed to detect any disturbances in the process from irregularities in the wire feed rate, e.g. in the case of incompletely melted wire. To this extent, a simple means of fitting and removal must be provided. For example, the device is fastened on a rotation spindle by means of a locking central screw fastener. The secondary gas nozzle is centered by suitable means by the primary gas nozzle, wherein the secondary gas nozzle can be embodied in such a way that thermal stresses are avoided by additional insulation elements, e.g. by a main insulator or a separate nozzle insulator.

Overall, a specified assembly sequence is obtained, wherein the cathode is centered in the housing, preferably in the cover element of the housing, by being screwed in and wherein the housing, preferably the cover element thereof, centers the primary gas distributor. The primary gas nozzle is centered on the primary gas distributor and centers the secondary gas nozzle. In this case, the components are advantageously interconnected and not connected to the housing, as in known devices. This is advantageous inasmuch as a common central axis is formed, wherein the components are not displaced due to thermal stresses, despite the considerable thermal effects.

It is expedient if the insulation elements are embodied by a plurality of components in the form of a nozzle ring, nozzle insulator and main insulator, for example.

The nozzle ring is made from a ceramic material, preferably from a high-performance ceramic material, and has an electrically and thermally insulating effect between the housing and the wire guide. The nozzle ring is the only external insulator in the otherwise metallic external form of the entire device or housing. The function of the nozzle ring can also be embodied as an extension of the secondary gas nozzle. In one possible embodiment, the nozzle ring is of funnel-shaped design and extends from an outer ring in the direction of a central opening. It is also possible to embody the nozzle ring in the manner of a sleeve with a wall portion extending away from a base flange. It is also possible to provide a funnel-shaped portion on which a wall portion extending away from the latter is arranged. In a preferred embodiment, the nozzle ring is polished, preferably to a mirror finish, at least on the surface thereof which faces away from the cathode, in order to avoid adhesions. The nozzle ring can be of single-part or multipart construction, wherein ceramics or materials such as silicon nitride, aluminum nitride, boron nitride, zirconium oxide, aluminum oxide, ATZ or ZTA can preferably be used to produce the nozzle ring. Surprisingly, it has been observed that good results in avoiding reflected and/or deflected particles and/or enabling them to be removed can be achieved especially by using aluminum nitride. By virtue of the particularly high thermal conductivity and relatively high temperature stability of aluminum nitride, heat is removed very quickly from the reflected and/or deflected particles which strike the polished nozzle ring surface, with the result that the particles solidify without causing local defects in the aluminum nitride. Mechanical interlocking of the particles is avoided through the surface finish. The composite ceramic Shapal™ is another ceramic material for the nozzle ring with a very high thermal conductivity and high electric strength. In the event of relatively small splashes, the effect of better heat dissipation and thus of more rapid solidification of the splashes is achieved by means of the invention before these splashes destroy the surface finish of the ceramic material through local overheating and local interlocking of the particles is thus made possible.

In order to avoid adhesions on the nozzle ring, a number of measures can be provided in addition:

The nozzle ring is of multipart design and has a partial anti-adhesion and/or insulating layer on the inside.

The nozzle ring is of single-part design and has a partial anti-adhesion and/or insulating layer on the inside and on the outside.

The nozzle ring is of multipart construction and has an extended configuration.

The nozzle ring is of single-part construction and has an extended configuration.

The nozzle ring is of single-part construction, being embodied as a shielding gas nozzle with holes centrally in one plane.

The nozzle ring is of single-part construction, being embodied as a shielding gas nozzle with holes tangentially in one plane.

The nozzle ring is of single-part construction, being embodied as a shielding gas nozzle with holes tangentially in a plurality of planes.

The nozzle ring is of single-part construction, being embodied as a shielding gas nozzle with a slot and holes tangentially in a plurality of planes.

The nozzle ring is of multipart construction, being embodied as a shielding gas nozzle with a slot and tangential labyrinth holes.

It is advantageous if a shielding gas flow is introduced in order to avoid and/or remove reflected and/or deflected particles, wherein the shielding gas flow is produced continuously and/or in a pulsed manner around the spray jet. To produce the shielding gas flow, the process gases can be used and, in particular, the secondary gas can be supplied as a shielding gas. It is also possible to supply other gases as process gases, e.g. air, argon or other gases. The shielding gas can flow through centrally arranged holes and/or tangentially arranged holes in one or more planes of the nozzle ring. Moreover, flow can take place through slotted nozzles and/or slotted nozzles with centrally and/or tangentially arranged holes in one or more planes of the nozzle ring in order to stabilize the shielding gas flow. Moreover, the shielding gas flow can take place through slotted nozzles with a labyrinth comprising centrally arranged holes/slots and/or tangentially arranged holes/slots in order to stabilize said flow.

The nozzle insulator is preferably formed from a ceramic material, and, although it is possible to dispense with a high-performance ceramic material, such a material can, of course, be used, exerting an electrically and thermally insulating effect between the housing/cathode and the secondary gas nozzle. By means of the nozzle insulator, thermal stresses between the main insulator and the ceramic secondary gas nozzle can be avoided. The nozzle insulator is a separate component, although it can be omitted if its function is integrated into the main insulator. As a separate component, the nozzle insulator resembles a spring ring in its design. The nozzle insulator is preferably fitted into the main insulator, and therefore a corresponding circular segment is left open in the region of the wire guide.

In an advantageous embodiment, the main insulator is formed from a high-temperature plastic or from a ceramic material and provides thermal and electrical insulation between the housing/cathode and the wire guide/wire. The main insulator accommodates the wire guide, i.e. the components thereof, and centers them.

The wire guide preferably has the components comprising the wire guide block, the wire guide tube and the wire guide screw. In general, these components correspond to those in WO2012/95371, which is hereby incorporated in full by reference as regards the ability to adjust or straighten the wire into the axis of the cathode/primary gas nozzle/secondary gas nozzle. However, the wire guide block has multipoint support, preferably three point support, for the wire on its inner circumference. This means that, within the wire guide block, the wire has contact for guidance with the interior of the wire guide block at a multiplicity of contact points, preferably at three contact points, as viewed in the circumferential direction of the wire. Adjacent to each of the contact points, there are free spaces introduced into the wire guide block, through which dirt particles adhering to the wire can be carried away. This is possible since the rotation and wire feed produce as it were an opposed delivery spiral. In the multipart wire guide, it is possible, by offsetting the wire guide block relative to the wire guide screw in the direction of the cathode-nozzle axis, to fix or adjust the angle of the wire guide axis relative to the cathode-nozzle axis. The wire guide axis is then no longer axial relative to the axis of rotation about which the device rotates and on which the wire guide screw is situated. To fix or adjust the particle jet angle, there is furthermore the possibility of changing the angle of the cathode-nozzle axis relative to the axis of rotation.

As already mentioned, the housing is of two-part design by way of example, with a main element and a cover element, and this is beneficial for ease of maintenance. The housing can be composed of copper, a copper alloy, especially brass, or of aluminum or an aluminum alloy, wherein the materials are, of course, not intended to be restrictive. In a preferred embodiment, the housing is formed from brass because of its properties, such as thermal expansion, heat capacity, thermal conductivity and surface finish, which are extremely advantageous during the operation of the device. The surface finish, in particular, is decisive as regards adhesion of overspray and/or spray dust, which is to be avoided, for which reason the surface is preferably polished in order to reduce roughness, counteracting deposition on the housing. If materials are nevertheless deposited on the housing, these can be removed easily, for which purpose an air jet may be sufficient with the device out of operation. Of course, mechanically driven brushes can also be used to remove deposits. The surface finish can be improved by suitable coatings. In a preferred embodiment, the housing is of predominantly round design. Only in the region of the nozzle opening, i.e. only on the side of the nozzle ring and only in the region of the nozzle ring, is the circular configuration of the housing as seen in cross section abandoned. Here, the housing is flattened, while there is an oblique transition to a plane in which the nozzle ring or nozzle opening is arranged. The consistent retention of the circular housing as seen in cross section avoids a blade effect, i.e. the process gases or air in a cylinder bore being taken along, thereby considerably reducing a negative influence of the blade effect on the particles to be transported in the direction of the surface to be coated. This flow-optimized surface configuration also has an effect in reducing deposits on the housing.

The cover element can be screwed to the main element to form the housing, wherein the secondary gas duct is arranged only in the main element and thus cools the housing on the side facing the process (dual function of the secondary gas).

In the sense according to the invention, a plasma is an ionized gas. A primary gas is a gas or a gas mixture for producing a plasma by means of various processes, e.g. by voltage discharge. The primary gas can be argon, nitrogen, a mixture of inert gases or a mixture of the gases mentioned by way of example with hydrogen and/or helium. The secondary gas can be air or compressed air. It is also possible to use argon, nitrogen or other inert gases as a secondary gas. Of course, the gases mentioned are to be understood as purely illustrative. However, it is expedient if at least the primary gas can be ionized, allowing an arc to be struck between the cathode and the wire end (anode).

By means of the invention, a device is made available for coating surfaces, especially for the internal coating of cylinder linings with small diameters (<60 mm) of internal combustion engines, which device can be rotated about its axis and, in the case of a consumable single-wire system embodied as an anode, can internally coat even small bore diameters in a stable process, at a high application rate and with a long service life and correspondingly reduced outlay on maintenance (rotating single-wire arc spraying). It is, of course, possible not only to consume a solid wire but also to consume filler wires. The electrical and thermal insulators required for operation in a reliable process are situated within the otherwise metallic external housing of the overall device (the preferred material, brass, is also referred to as metallic in the sense according to the invention). It is only in the region of the particle jet exit opening that electrical and thermal insulators are used. The arc is struck without the need for the presence of a pilot arc, directly between the cathode and the wire, which is expediently connected as the anode. The primary gas nozzle is isolated so as to be potential-free and is not connected as an anode, and therefore no arc starting point is to be expected either, favoring a longer service life of the primary gas nozzle. Moreover, a high-voltage arc, which is struck directly onto the wire or the end thereof, is advantageously produced. Even when subject to maximum temperature effects, the cathode, nozzle hole and wire remain on a positionally stable axis at all times since the components fix and center themselves, thus largely eliminating displacement due to thermal stresses from the housing to the components. It is also expedient that the primary gas nozzle is cooled by secondary gas, while the cathode is cooled by primary gas. Silicon nitride, aluminum nitride, Shapal™ or Maco® can be used as ceramic materials, for example, to name just a few ceramics or suitable materials.

By virtue of the fact that the primary gas nozzle is potential-free, i.e. due to the striking of the arc directly between the cathode and the wire, it is also possible for the torch, i.e. the device for coating, to be switched off completely after the coating of an engine block but especially after the respective coating of each of several bores. If the torch continued to be operated, i.e. if the arc were maintained, energy, process gas and also additional material, i.e. the wire, would be consumed, which would in fact not be necessary at all during the transfer to the next bore or the next engine block. By means of the invention, it is thus also possible to achieve an economizing effect in respect of the process gases, energy and additional material if the torch is switched off during the process of transfer to the next coating task. This is possible since a pilot arc can be dispensed with, ensuring that the primary gas nozzle is subject to less stress than if the pilot arc were resting on said nozzle. The consumption of material, the consumption of gas and the consumption of energy can thus be reduced. Instead of switching off the torch completely, partial shutdown is also possible, with the wire feed and energy supply being interrupted while the process gases could continue to flow. It is expedient here if the flow of process gases is reduced, although this allows the entry of extraneous substances and/or extraneous media to be avoided in all cases, even when the process gas flows are maintained at a reduced level.

The device according to the invention for coating rotates about its own axis while moving in a linear manner along the surface to be coated, that is to say in a bore, i.e. a cylinder lining, During this process, the material is applied in layers. It is expedient if a plurality of layers are applied one on top the other, each layer being very thin, i.e. having a thickness of just 5 µm, for example. This is possible with a device that rotates at high speed, the embodiment of the device according to the invention allowing speeds of 700 rpm to 1000 rpm. In this way, a multilayer coating, each layer of which cools very quickly owing to the thin layer thickness in each case, is produced. A nanostructure is thus formed in the coating.

It is possible if the component to be coated is assigned an extraction device which, for example, removes, i.e. extracts, overspray and dust by producing an extraction flow in a cylinder bore to be coated, for example, during the coating process. In order to influence the extraction cross section as little as possible, it is expedient if the torch inserted into the bore together with the connector thereof occupies a constant cross section, thus also allowing uniform extraction, something that would not be possible if the connector were larger in cross section and/or longitudinal section than the housing, for example.

It is also expedient in the invention if a spacing between a free end of the housing and the nozzle opening through which the spray jet emerges is as small as possible. This enables the device to fully coat even bores which have resistance elements, e.g. bearing slots or similar elements, at their low end. By virtue of the fact that the device has an extent which is as short as possible at its free end, the bore can be coated virtually as far as the resistance element, even if the linear motion of the device were in fact hindered.

It is also possible for the spray jet not only to emerge parallel to the cathode axis but also obliquely thereto. Thus, the spray jet can be deflected relative to the cathode axis by setting pressure differences in the process gases in respect of the holes in the primary gas distributor and in the secondary gas distributor. Thus, the spray jet can also be deflected by means of measures concerned with flow engineering toward the lower edge of the bore to be coated in order to ensure coating even though coating would actually not be possible at all because of a resistance element. This slope of the spray jet is also helpful if transitions between selective embedding zones (selective bore area spraying: SBAS) within the cylinder lining are to be coated.

Further advantageous details and effects of the invention will be explained in more detail below on the basis of various exemplary embodiments illustrated in the figures. In the figures.

In the different figures, identical parts are always provided with the same reference signs, and so said parts are generally also described only once. In FIGS. 4 to 11, the components are each shown in perspective from both sides, i.e. from a lower side and an upper side. In FIGS. 18 to 22, a cross section and a plan view are shown in each case.

Figure 1:
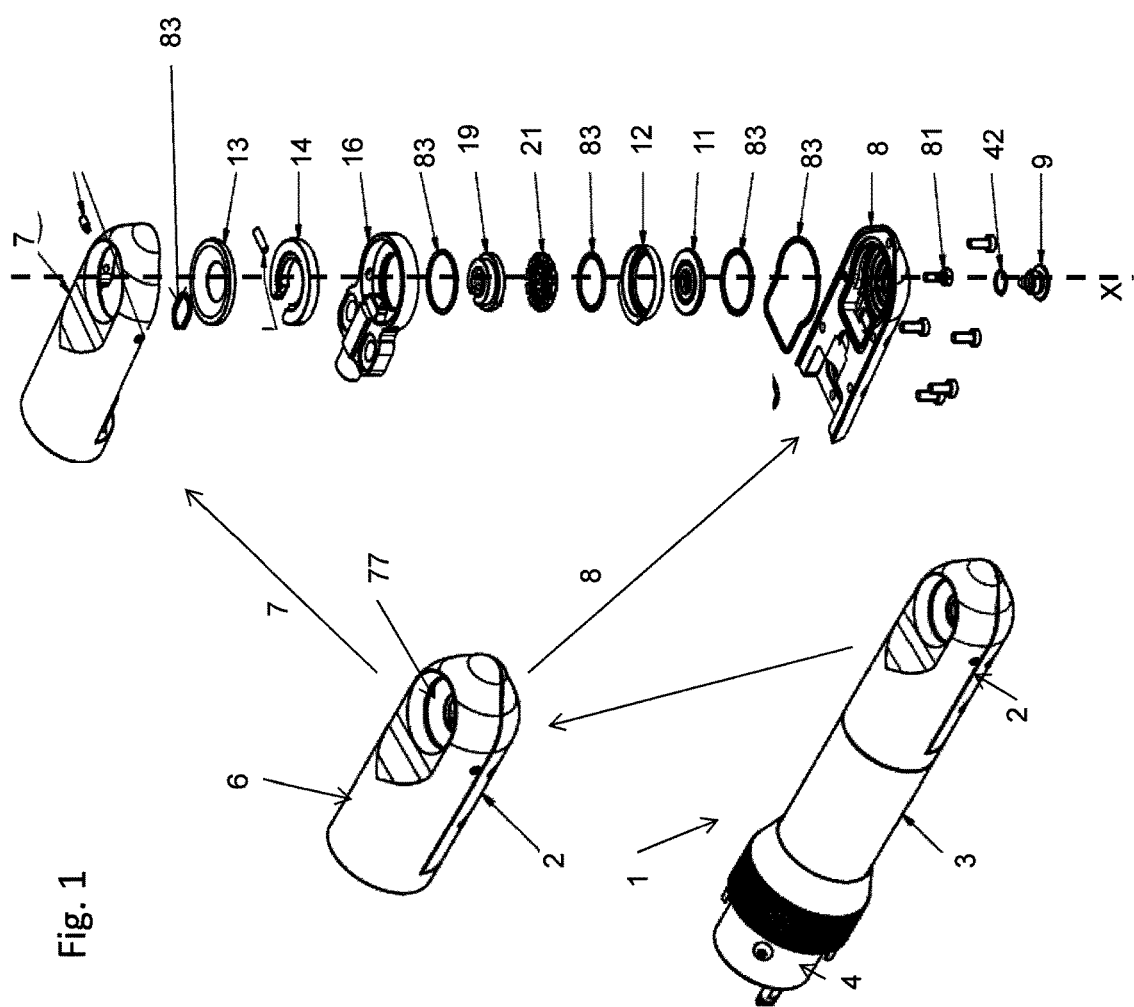
FIG. 1 shows an exploded view of a device for thermally coating a surface.

FIG. 1 shows a device 1 for thermally coating a surface. The device 1 can be referred to as a torch 1, which is suitable for thermally coating a cylinder bore, even one of relatively small diameter of less than 60 mm. For this purpose, an arc is struck in the device 1, said arc melting the sprayed filler material, wherein molten material is carried to the surface to be coated. For this purpose, two gases, namely primary gas and secondary gas, are used. The purpose of the primary gas is to maintain or support the arc, and the primary gas additionally has cooling functions, while the secondary gas also has a dual function. On the one hand, the secondary gas is intended to assist transfer of the molten particles and to further atomize and accelerate the particles. On the other hand, the secondary gas has a cooling function, further details of which will be given below. The primary gas can be argon, nitrogen, a mixture of inert gases or a mixture of the gases given by way of example with hydrogen and/or helium. The secondary gas can be air or compressed air. It is also possible to use argon, nitrogen or other inert gases as a secondary gas. Of course, the gases mentioned by way of example are not intended to be restrictive.

The device 1 can have a head part 2, e.g. a connector 3 as an intermediate part and an adapter 4 as a connection part, while primary gas connections, secondary gas connections, power source connections, control and monitoring devices and a wire are not shown in FIG. 1. To coat a cylinder bore, the device rotates upon itself and is moved linearly backward and forward at the same time. Of course, a linear motion of the component to be coated can also be performed instead of the linear motion of the device. Of course, the same also applies to the rotary motion, where expedient.

Figure 2:
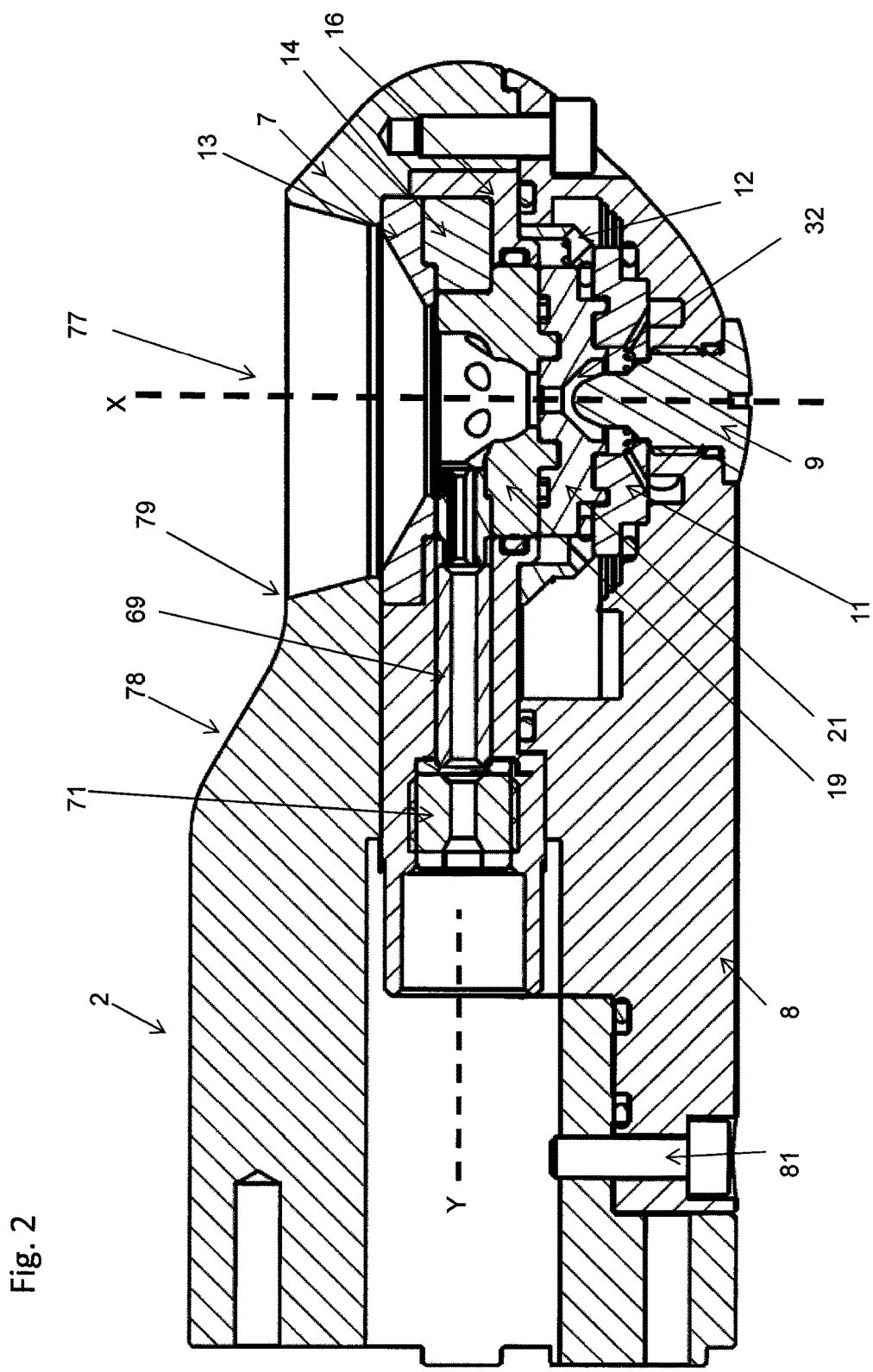
FIG. 2 shows a partial longitudinal section through the device.

As illustrated by way of example, the device 1 for thermally coating a surface comprises a two-part housing 6 having a main element 7 and a cover element 8, a cathode 9, a primary gas distributor 11, a secondary gas distributor 12, electrically and thermally acting insulation elements 13, 14 and 16, and an anode, which is designed as a consumable wire and is guided into a secondary gas nozzle 19 by means of a wire guide 18 (FIGS. 2 and 12), wherein a primary gas nozzle 21 is mounted in a centered manner on the primary gas distributor 11 with the secondary gas distributor 12 connected in parallel and has openings, i.e. holes or slots 23 (FIG. 4), arranged radially in one plane on its side 22 oriented toward the secondary gas nozzle 19.

By way of example, the primary gas nozzle 21 (FIG. 4) has a cylindrical external shape, wherein engagement elements 26 for engagement in corresponding depressions 27 in the primary gas distributor 11 are arranged on the side 24 oriented toward the primary gas distributor 11, thus in all cases ensuring centered installation of the two components relative to one another. By way of example, the engagement elements 24 are designed as annular webs, wherein the depressions 27 can be embodied in annular form to correspond thereto. The engagement element 26 of the primary gas nozzle 21 comes to rest by means of its inner circumference on an outer circumference of the depression 27 in the primary gas distributor 11. In this way, a design appropriate for ceramics is created in which the element with the higher thermal expansion coefficient (in this case the metallic (copper jacketed) primary gas nozzle 21) is arranged around the element with the lower thermal expansion coefficient (in this case the ceramic primary gas distributor 11). As a result, it is only ever compressive stresses which arise in the ceramic material. The inner, annular raised portion is used exclusively for UV and radiant heat protection of the primary gas distributor 11. Centering elements 28 are likewise provided on the side 22 of the primary gas nozzle 21 oriented toward the secondary gas nozzle 19, said elements interacting with a corresponding countercentering element 29 on the secondary gas nozzle 19, which are arranged on the side 31 oriented toward the primary gas nozzle 21. The countercentering element 29 on the secondary gas nozzle 19 is embodied as an annular raised portion, which comes to rest between the centering elements 28 on the primary gas nozzle 21, which are embodied as annular webs. The outer centering element 28 on the primary gas nozzle 21 comes to rest by means of its inner circumference on an outer circumference of the centering element 29 on the secondary gas nozzle. Of course, the primary gas nozzle 21 can also be made from a ceramic material, the embodiment being as described.

Figure 14:
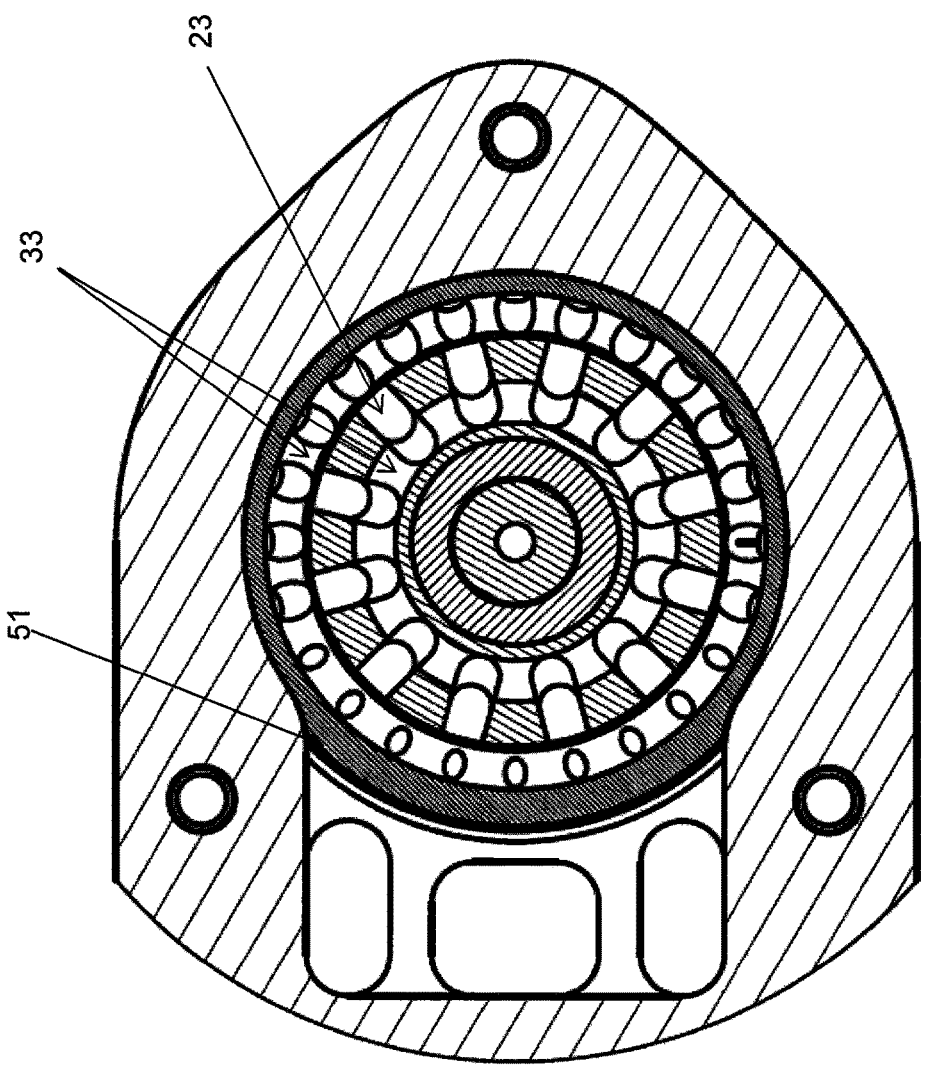
FIG. 14 shows a plan view of a secondary gas labyrinth.

The arrangement of the openings, i.e. of the slots 23, in a common radial plane in conjunction with the secondary gas nozzle 19 leads to the formation of a secondary gas labyrinth 33 (FIG. 14), thus allowing the secondary gas to be used to cool the primary gas nozzle 21.

Figure 8:
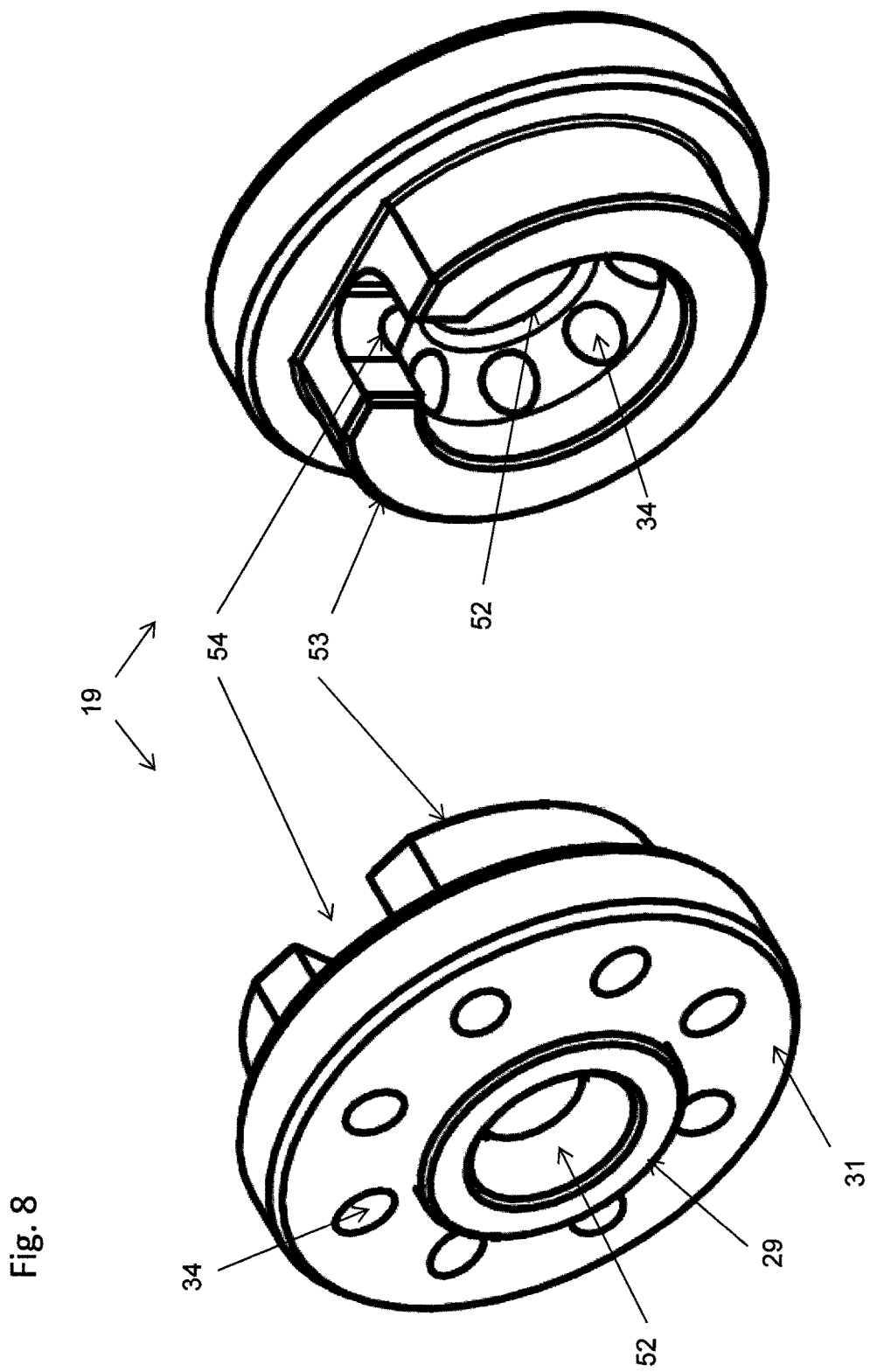
FIG. 8 shows a secondary gas nozzle as a detail.

In order to be able to achieve the advantageous cooling of the primary gas nozzle 21 with secondary gas, it is advantageously proposed that the number of radial slotted openings, i.e. slots 23, is symmetrically greater than a secondary gas hole number of secondary gas holes 34 in the secondary gas nozzle 19 (FIG. 8). For example, twelve radial slots 23 arranged in one plane can be provided in the primary gas nozzle 21, thus allowing just eight secondary gas holes 34 to be arranged in the secondary gas nozzle 19. If ten slot 23 were provided, six secondary gas holes 34 would be possible, for example. For distribution of the flows from the openings, i.e. from the slots 23 in the primary gas nozzle 21, into the holes in the secondary gas nozzle 19, an annular groove, the inside and outside diameter of which advantageously correspond to the resulting diameters of the secondary gas holes in the opening plane, i.e. in the slot plane, can be integrated into the primary and/or secondary gas nozzle as a further part of the labyrinth. Basically, the primary gas nozzle 21 is centered in the primary gas distributor 11 and centers the secondary gas nozzle 19.

By way of example, the cathode 9 (FIG. 5) is formed from two materials, wherein a preferably tungsten-alloyed core 36 is preferably encapsulated with copper, thus forming a copper jacket 37.

The cathode 9 is embodied in a finger shape at its preferably tungsten-alloyed core 36, and this, in combination with a convergent inlet zone of the primary gas nozzle 21, leads to a slight arc constriction, thereby allowing helpful temperature distribution in the arc starting point, this in turn being advantageous for the service life of the cathode 9. It is also helpful if the primary gas nozzle 21 has an inlet zone for the primary gas which converges in a manner centered with respect to the cathode or is divergently convergent, thus ensuring a reduction of turbulence in the primary gas in order to achieve a less turbulent primary gas flow.

The encapsulated copper jacket 37 is, for example, of hat-type design with a sleeve portion 38 and a flange 39 formed integrally thereon. The finger-shaped core 36, which is preferably tungsten-alloyed, is accommodated in the sleeve portion 38. The finger-shaped core 36 is characterized in that it projects beyond the sleeve portion 38 by means of its, preferably rounded, tip. It is also possible to form at least one encircling groove in the tip region of the finger-shaped core 36. An external thread, which interacts with a corresponding internal thread in the cover element 8 of the housing 6, is arranged on the outer circumference of the sleeve portion 38. Herein lies another advantage of the invention, in which the cathode 9 can be screwed into the housing 6, i.e. into the cover element 8. The cathode 9 is thereby advantageously arranged in a manner centered within the housing 6 by way of the threaded portion and by means of the flange 39 and also remains in this centered position despite the considerable action of heat during operation. The cathode 9 can therefore advantageously be connected frictionally and positively to the housing 6, avoiding simple nonpositive support for the cathode 9 within the housing 6, ensuring that the action of heat has no deleterious effects in terms of unwanted loosening of the screwed joint and harmful thermal stresses also no longer have any effect in terms of possible displacement of the cathode 9. The flange portion 39 can have an outer key surface 41 in order to screw the cathode 9 into the housing 6 and release it again. The key surface can be embodied as a slot for a simple screw driver, as illustrated. However, it is also possible to embody key surfaces as a cross-slit, for Torx driver tools or similar driver tools. It is also possible to provide a circumferential key surface in the form of a hexagon for the engagement of a jaw- or ring-type tool on the flange portion 39. It is expedient if the key surface 41 is arranged on the outside, i.e. is accessible from the outside of the housing 6. In this way, the cathode 9 can be inspected and/or replaced simply by being unscrewed, without the need to open the entire housing.

Sealing of the cathode 9 relative to the external housing 6 can be achieved by means of an O-ring 42 (FIG. 1) between the flange 39 and the cover element 8.

By way of example, the primary gas distributor 11 (FIG. 6) is formed from a ceramic material and, in addition to its actual gas distribution function, thus also acts as a thermal and electrical insulator between the housing 6, the cathode 9 and the primary gas nozzle 21. In a preferred embodiment, the primary gas distributor 11 has convergently and/or concentrically arranged holes 43, which extend from a lower side 44 to a side 46 oriented toward the primary gas nozzle 21. Thus, homogeneous gas distribution and simultaneous cathode cooling by means of the primary gas are possible. With the expedient arrangement and embodiment of the holes, turbulence in the primary gas is avoidable, and this, in turn, has a positive effect in terms of reduced cathode temperature and reduced cathode wear relative to turbulent primary gas. It is advantageous if a large number of holes 43 is arranged in the primary gas distributor 11, it being possible to provide so many holes 43 that the primary gas distributor 11 can be embodied virtually as a membrane.

By way of example, the secondary gas distributor 12 (FIG. 7) has convergently and/or concentrically arranged holes 48 of different hole diameters, which can thus bring about equalization of the secondary gas streams within the housing 6. As is apparent, the holes 48 in the secondary gas distributor 12 have different diameters, i.e. decreasing and increasing diameters, as seen in a circumferential direction, wherein, by way of example, two different hole diameters, i.e. a smaller 48a and a larger hole diameter 48b are provided, thus forming rows of holes, each of the same diameter, wherein the final holes in the respective row, which are of large hole diameter, are adjacent to the final holes of the respective other row, which are of smaller hole diameter. The holes 48 ensure favorable distribution of the secondary gas. The number of holes is preferably selected so that it is greater than the number of slots 23 in the primary gas nozzle 21. In interaction with the primary gas nozzle 21, a further secondary gas labyrinth 33 (FIG. 14) is thus as it were formed and, in this way, the primary gas nozzle 21 is also well cooled on the outside. As is apparent by way of example, the secondary gas distributor 12 has an assembly aid 51, thus allowing the diameter of the holes 48 to be oriented selectively and in accordance with the desired effect (see above). By way of example, the assembly aid 51 is embodied as an extension, and the secondary gas distributor 12 is thus as it were embodied in a manner similar to a cap with a peak, although this is, of course, intended only by way of example.

The secondary gas nozzle 19 (FIG. 8) is also formed from a ceramic material and thermally and electrically insulates the housing 6, the cathode 9, the wire guide 18 and indeed also the wire. The secondary gas nozzle 19 has a side 31 arranged toward the primary gas nozzle 21 and, opposite said side, a wall portion 53 surrounding a central opening 52, in which a single recess 54 for the wire is formed. The secondary gas nozzle 19 preferably has convergently and concentrically arranged holes 34, with the result that the secondary gas forms a pressure cone. Here, the arrangement of holes is advantageously symmetrical with respect to the wire feed axis Y, which is perpendicular to the cathode axis X (FIG. 2) by way of example, although, of course, other arrangements are also possible. In an advantageous embodiment, the hole axes form a theoretical atomization point, although the abovementioned pressure cone is produced. This means that the secondary gas columns flowing out through the respective hole 34 do not intersect opposite the theoretical atomization point of the hole axes but as it were form a pressure cone enveloping the primary gas. In the region of the side facing the primary gas nozzle 21, the internal shape of the secondary gas nozzle 19 represents an extension of the internal contour of the primary gas nozzle 21. The formation of a pressure cone is thus additionally assisted by the centrally flowing primary gas.

It is furthermore apparent that the secondary gas nozzle 19, in particular the wall portion 53 thereof, has only a single inlet opening (recess 54) in the delivery direction but opposite said opening is closed, thus preventing the wire from being transported out of the device 1. Apart from promoting uniform formation of the pressure cone, this enables the control and monitoring device for wire feed to detect any disturbances in the process from irregularities in the wire feed rate, e.g. in the case of incompletely melted wire. The secondary gas nozzle 19 is centered by suitable means 29 and 28 by the primary gas nozzle 21, wherein the secondary gas nozzle 19 can be embodied in such a way that thermal stresses are avoided by additional insulation elements 13, 14, 16, e.g. by a main insulator or a separate nozzle insulator 14.

Figure 3:
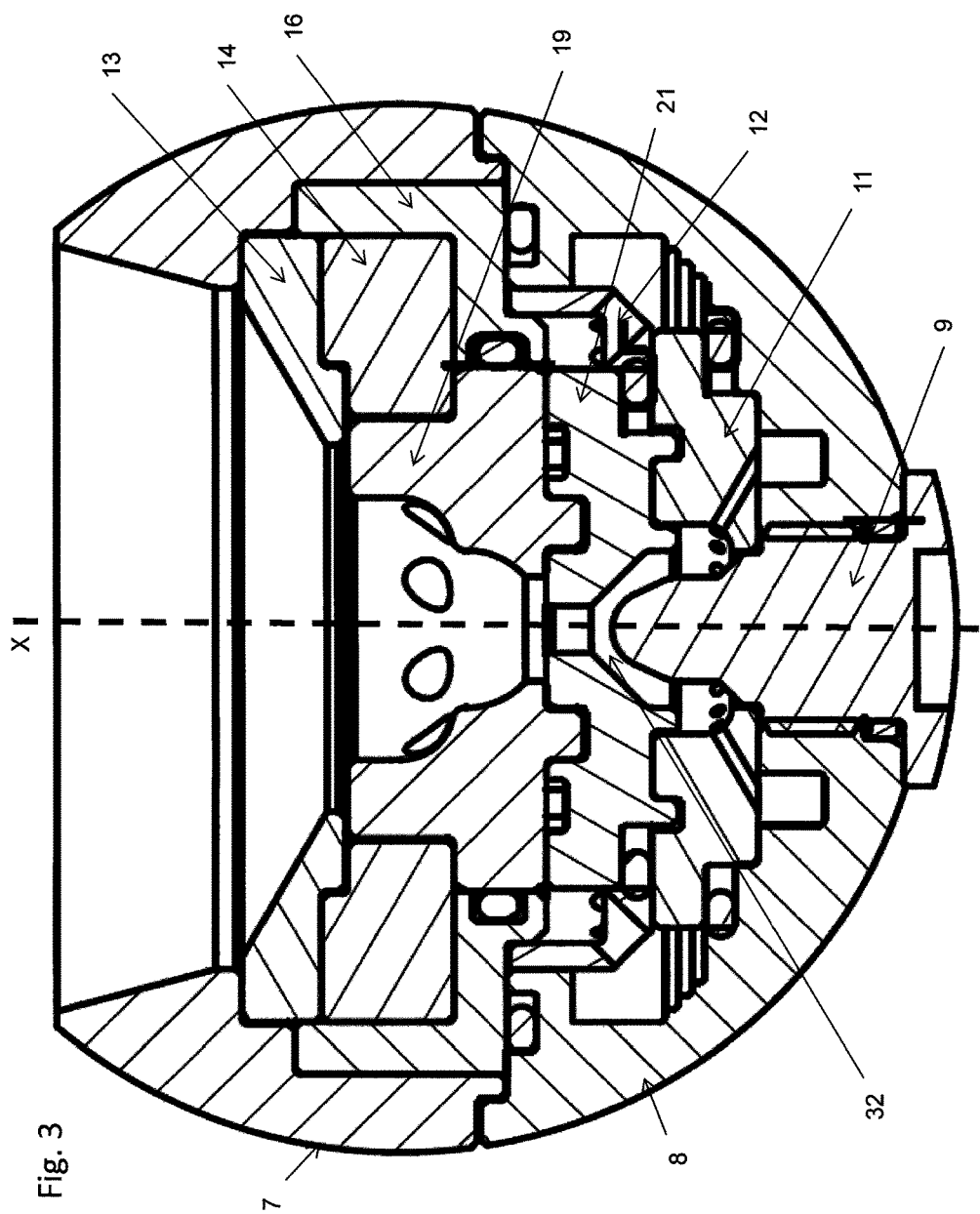
FIG. 3 shows a partial cross section through the device.
Figure 4:
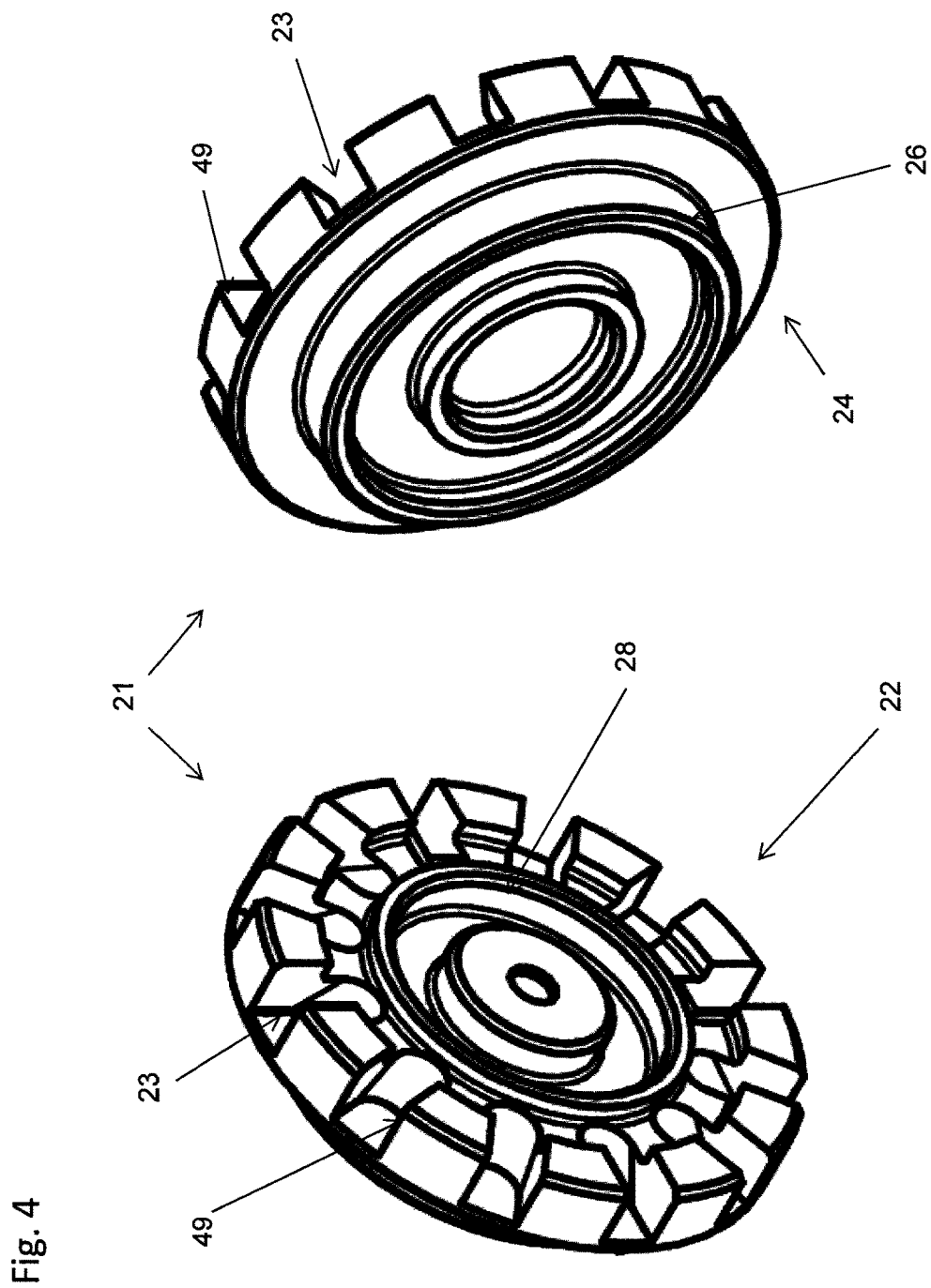
FIG. 4 shows a primary gas nozzle as a detail.
Figure 5:
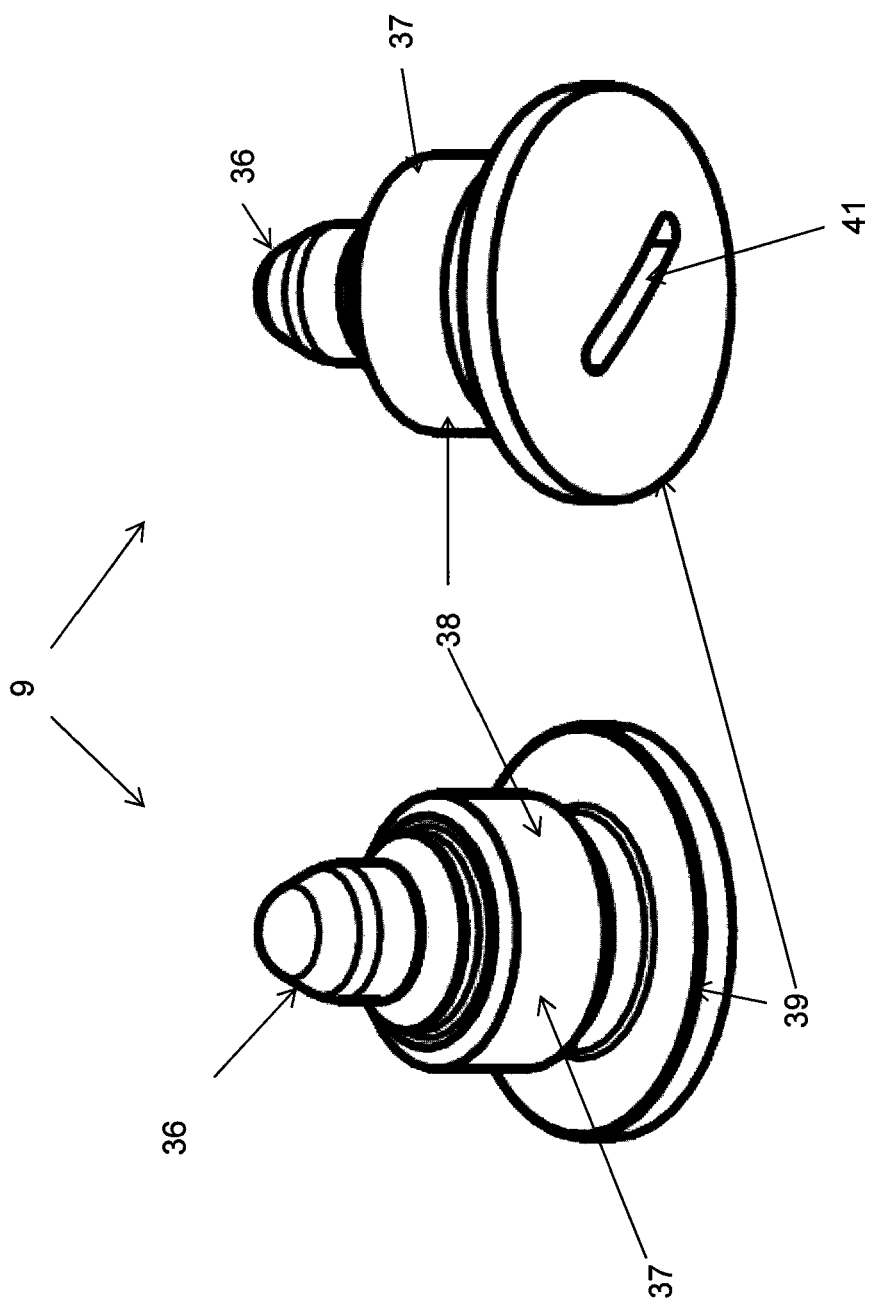
FIG. 5 shows a cathode as a detail.
Figure 6:
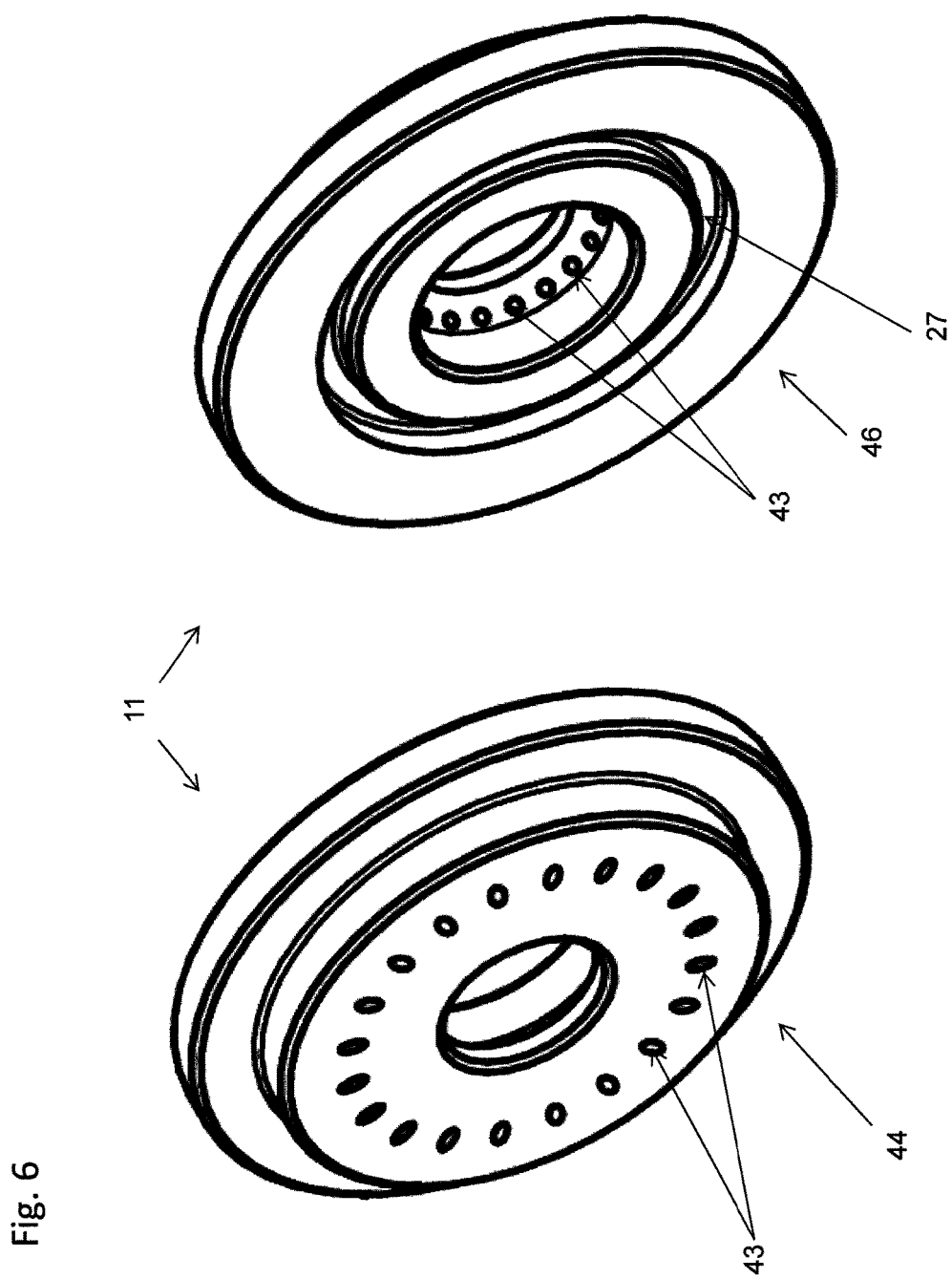
FIG. 6 shows a primary gas distributor as a detail.
Figure 7:
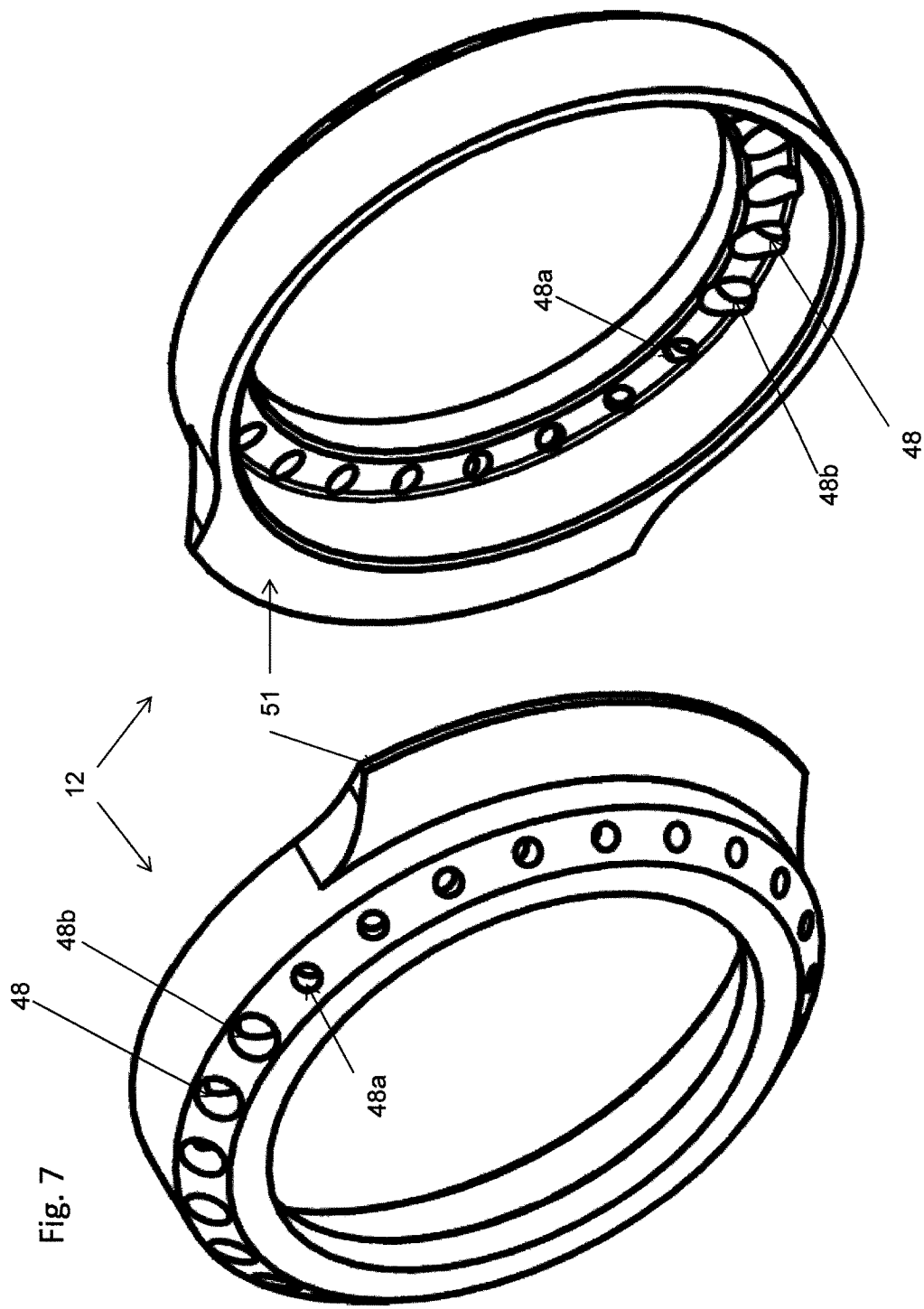
FIG. 7 shows a secondary gas distributor as a detail.

Overall, a specified assembly sequence (FIGS. 1 to 3) is obtained, wherein the cathode 9 is centered in the housing 6, preferably in the cover element 8 of the housing 6, by being screwed in and wherein the housing 6, e.g. the cover element 8 thereof, centers the primary gas distributor 11. The primary gas nozzle 21 is centered on the primary gas distributor 11 and centers the secondary gas nozzle 19. This is advantageous inasmuch as a common central axis X (cathode axis X) is formed, wherein at least components 9, 11, 12, 21 and 19 are not displaced due to thermal stresses, despite the considerable thermal effects.

It is expedient if the insulation elements are embodied by a plurality of components in the form of a nozzle ring 13, nozzle insulator 14 and main insulator 16, for example.

Figure 9:
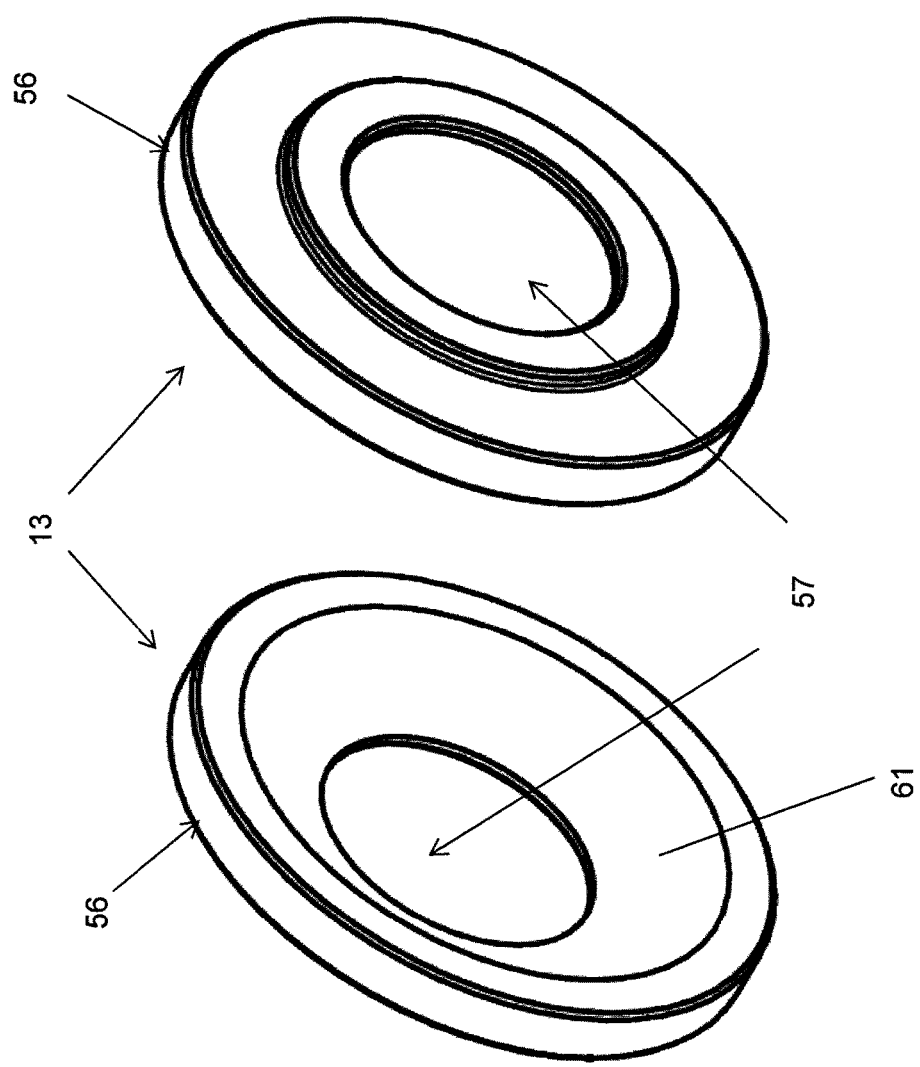
FIG. 9 shows a nozzle ring as a detail, in a first embodiment
Figure 9A:
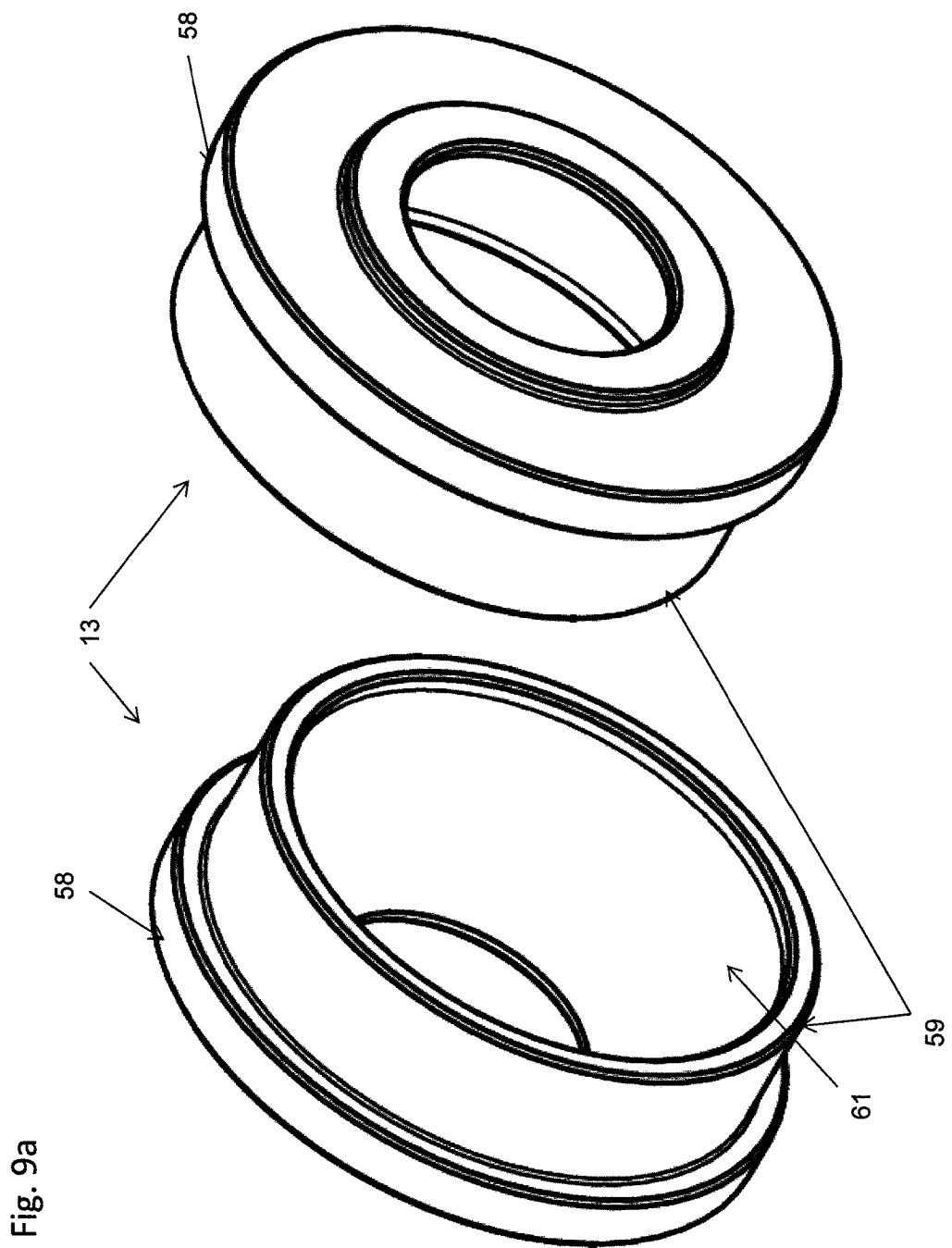
FIG. 9a shows a nozzle ring as a detail, in a second embodiment
Figure 10:
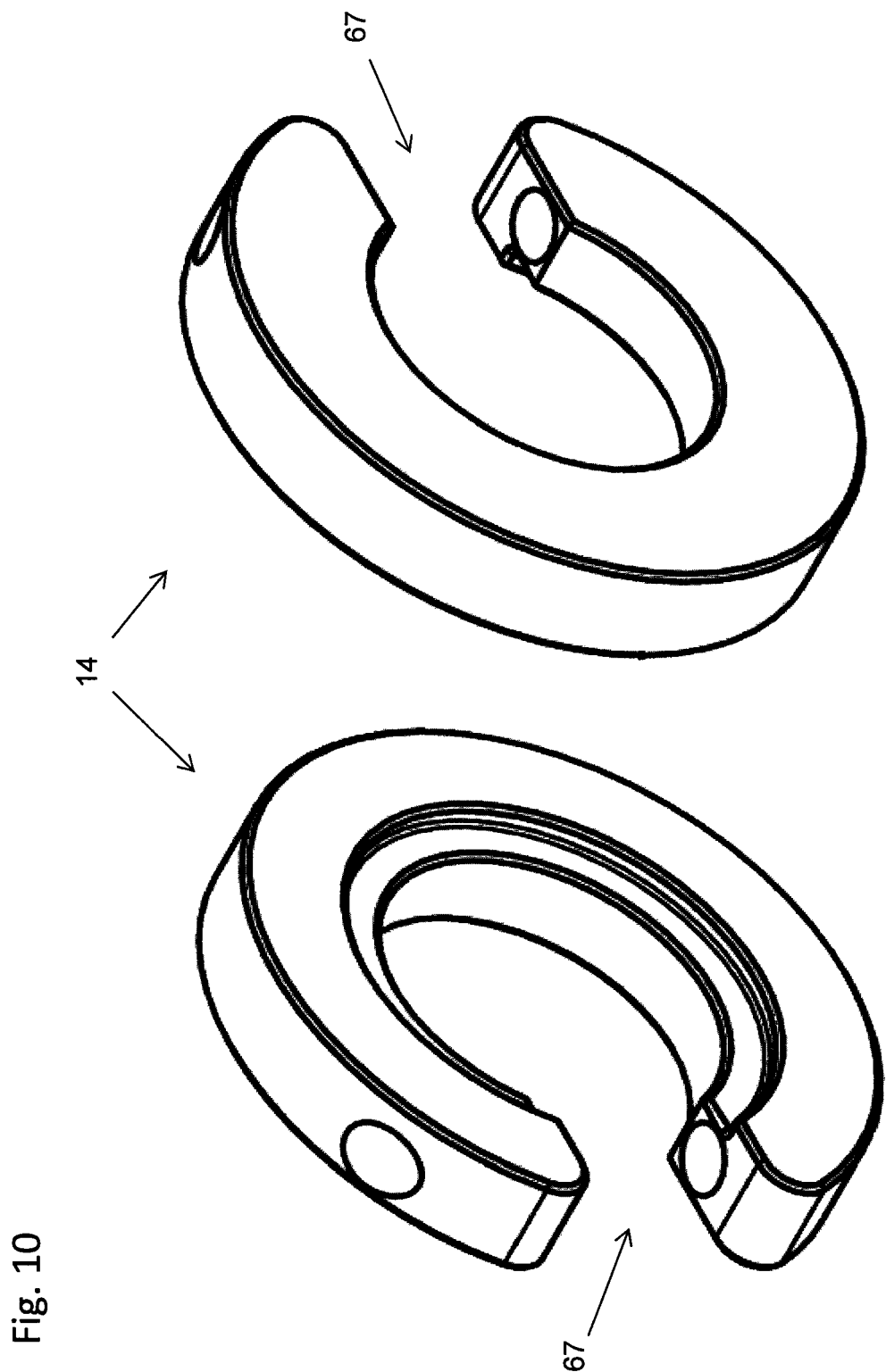
FIG. 10 shows a nozzle insulator as a detail.
Figure 11:
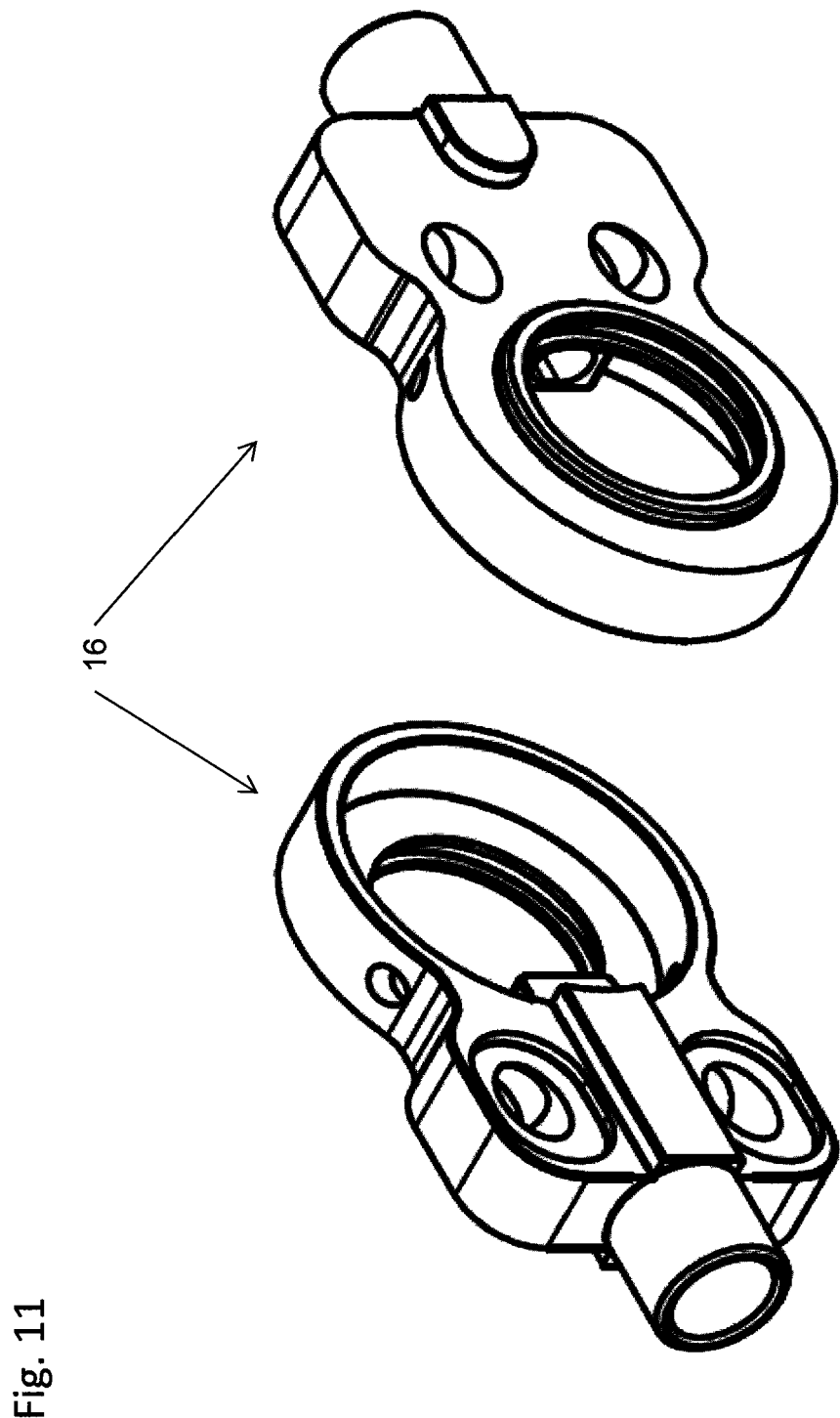
FIG. 11 shows a main insulator as a detail.

The nozzle ring 13 (FIG. 9) is made from a ceramic material, preferably from a high-performance ceramic material, and has an electrically and thermally insulating effect between the housing 6 and the wire guide 18. The nozzle ring 13 is the only external insulator in the otherwise metallic external form of the entire device or housing 6. In one possible embodiment, the nozzle ring 13 is of funnel-shaped design and extends from an outer ring 56 in the direction of a central opening 57 (FIG. 9). It is also possible to embody the nozzle ring 13 in the manner of a sleeve (FIG. 9a) with a wall portion 59 extending away from a base flange 58, thus forming an extended version of the nozzle ring 13. In a preferred embodiment, the nozzle ring 13 is polished, preferably to a mirror finish, at least on the outer surface 61 thereof which faces away from the cathode 9, in order to avoid adhesions. The nozzle ring 13 can be of single-part or multipart construction, wherein ceramics or materials such as silicon nitride, aluminum nitride, boron nitride, zirconium oxide, aluminum oxide, ATZ or ZTA can preferably be used to produce the nozzle ring.

Figure 15:
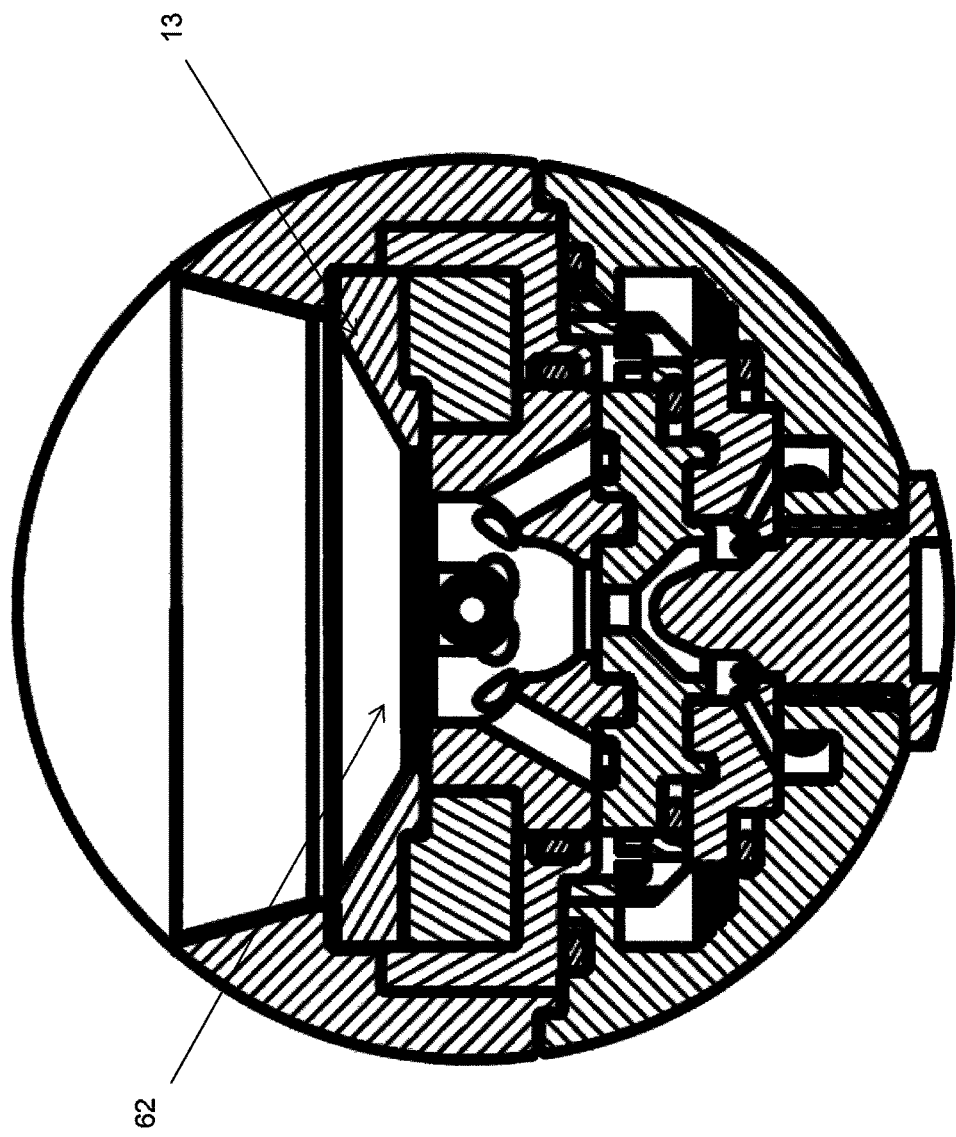
FIGS. 15-17 show possible embodiments of an anti-adhesion coating.

In order to avoid adhesions on the nozzle ring 13, a number of measures can be provided:

The nozzle ring 13 is of multipart design and has a partial anti-adhesion and/or insulating layer 62 on the inside (FIG. 15).

The nozzle ring 13 is of single-part design and has a partial anti-adhesion and/or insulating layer 62 on the inside and on the outside.

Figure 16:
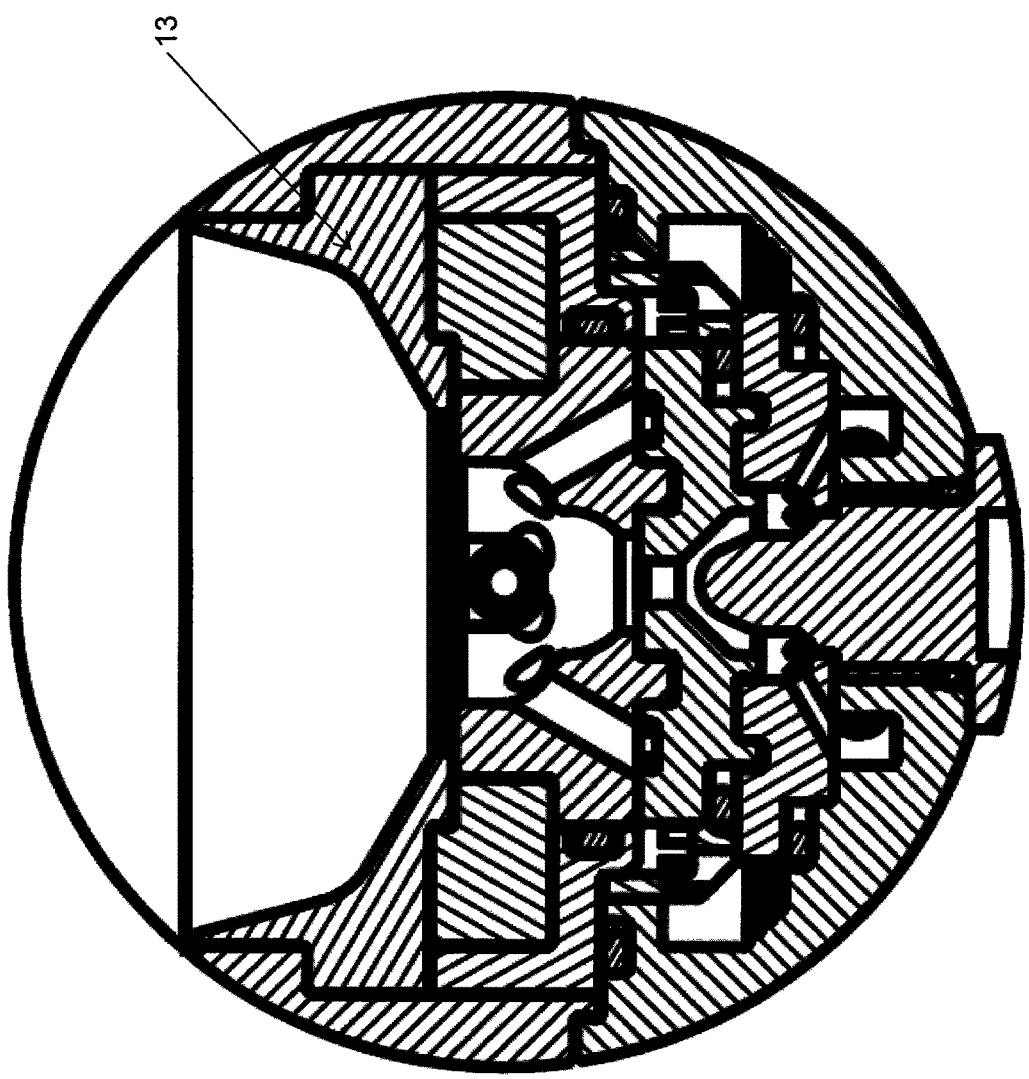

The nozzle ring 13 is of multipart construction and has an extended configuration (FIG. 16).

Figure 17:
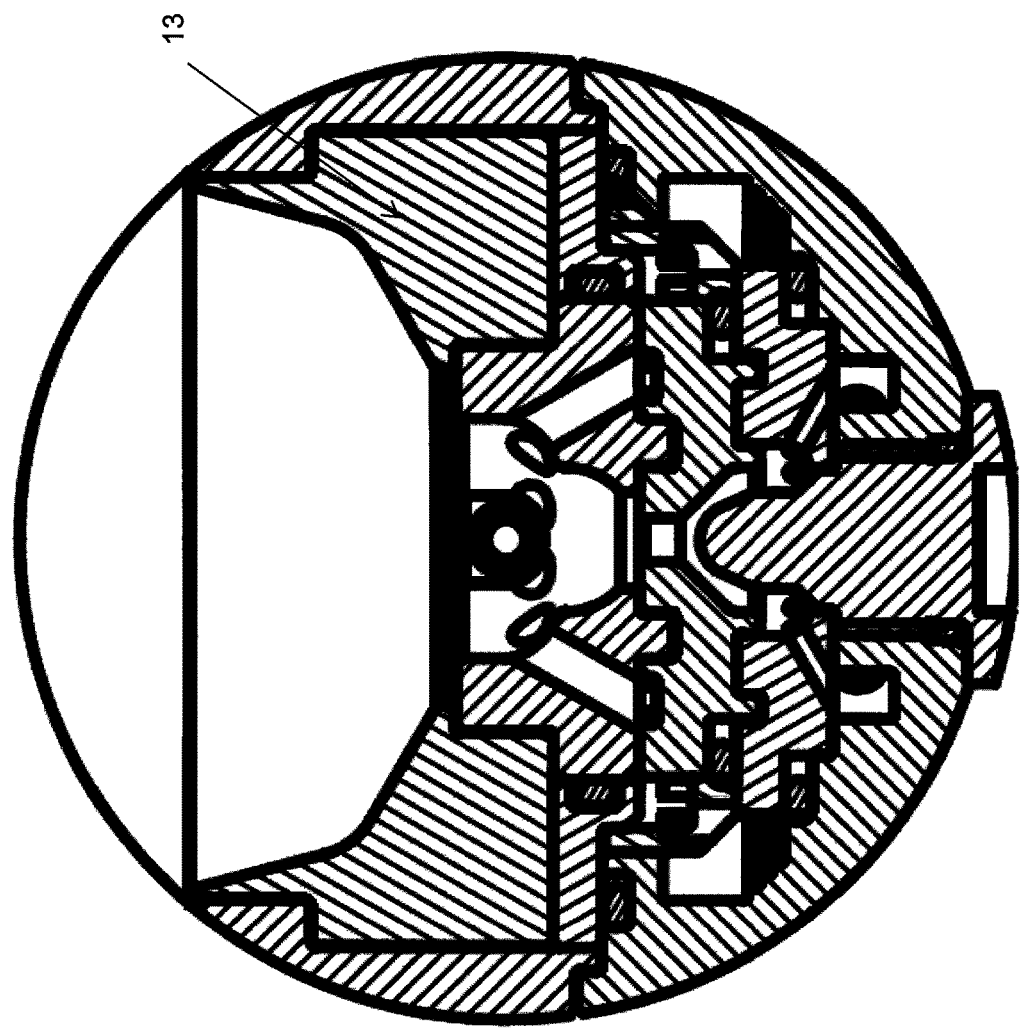

The nozzle ring 13 is of single-part construction and has an extended configuration (FIG. 17).

Figure 18:
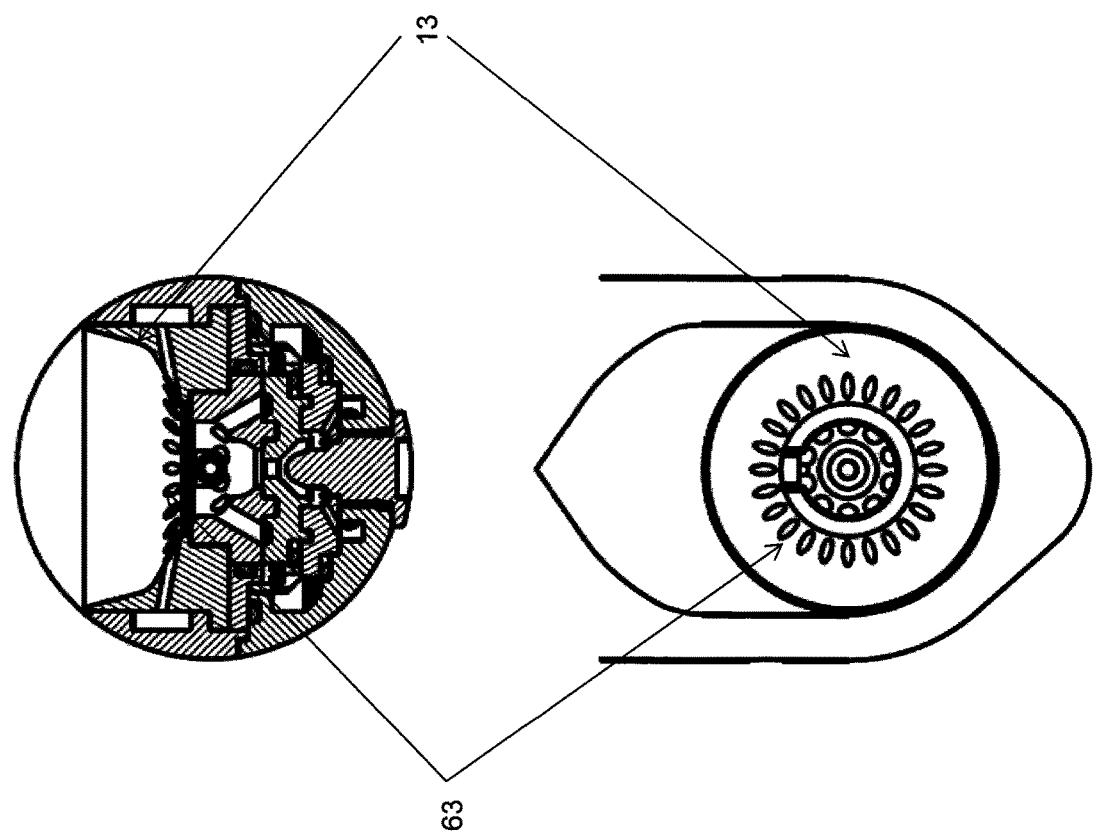
FIGS. 18-22 show possible embodiments of a shielding gas flow.

The nozzle ring 13 is of single-part construction, being embodied as a shielding gas nozzle with holes 63 centrally in one plane (FIG. 18).

Figure 19:
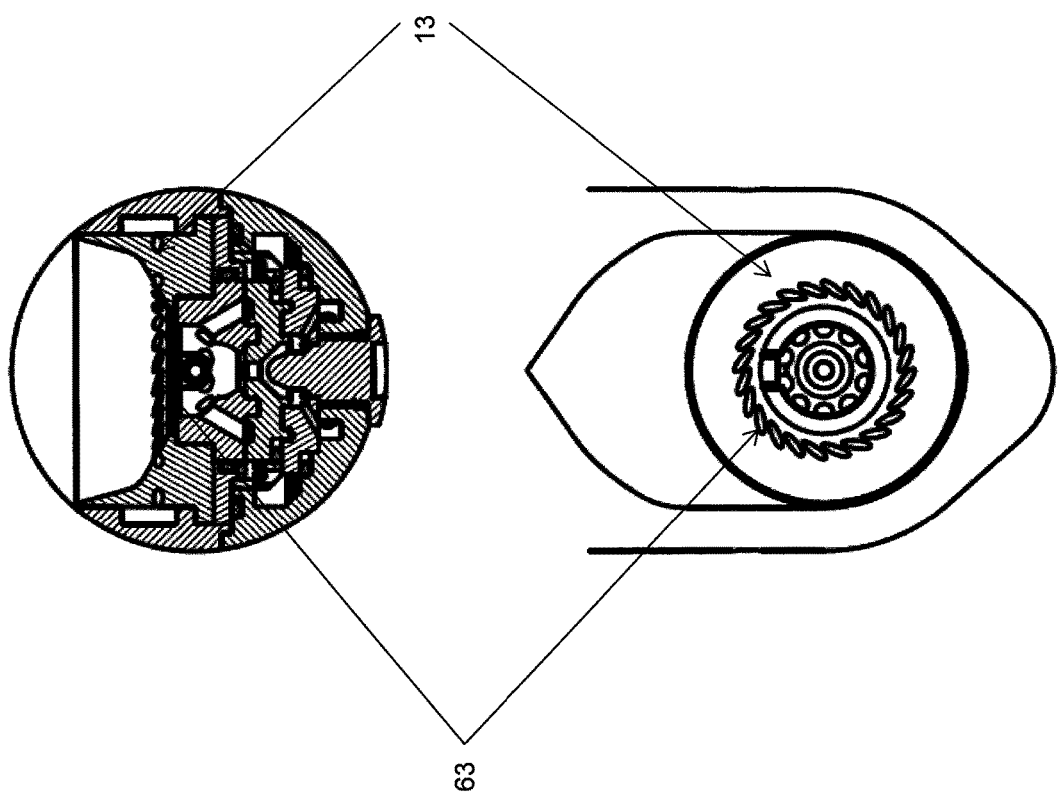

The nozzle ring 13 is of single-part construction, being embodied as a shielding gas nozzle with holes 63 tangentially in one plane (FIG. 19).

Figure 20:
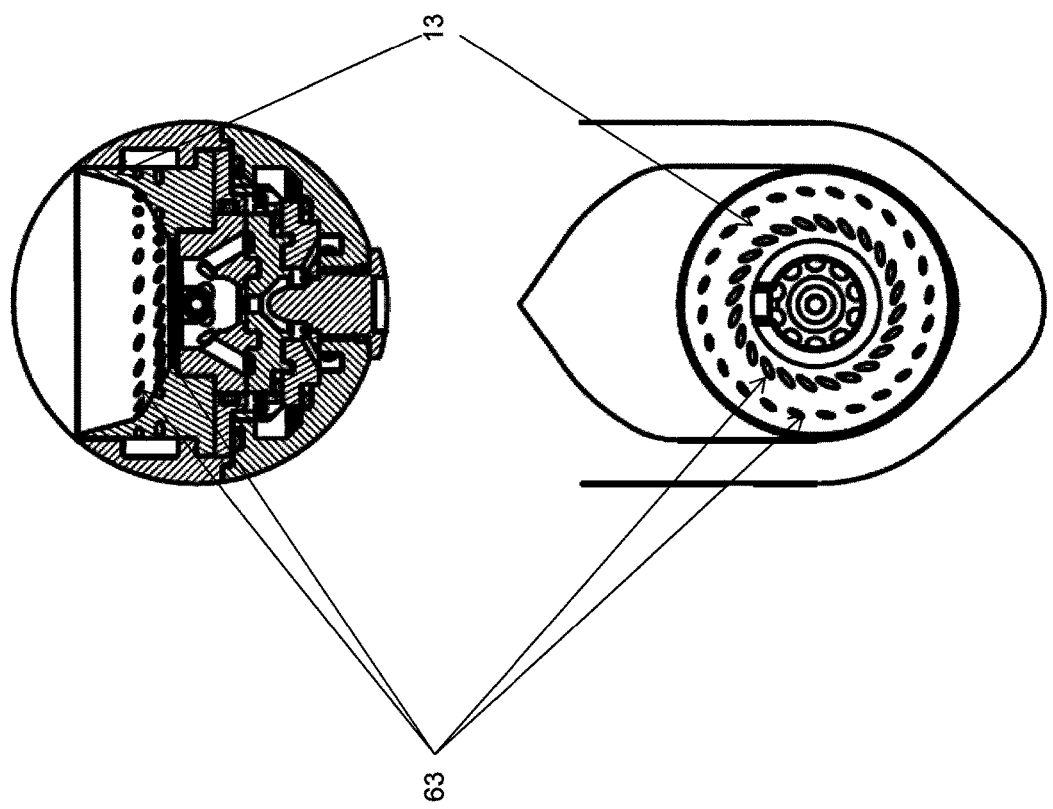

The nozzle ring 13 is of single-part construction, being embodied as a shielding gas nozzle with holes 63 tangentially in a plurality of planes (FIG. 20).

Figure 21:
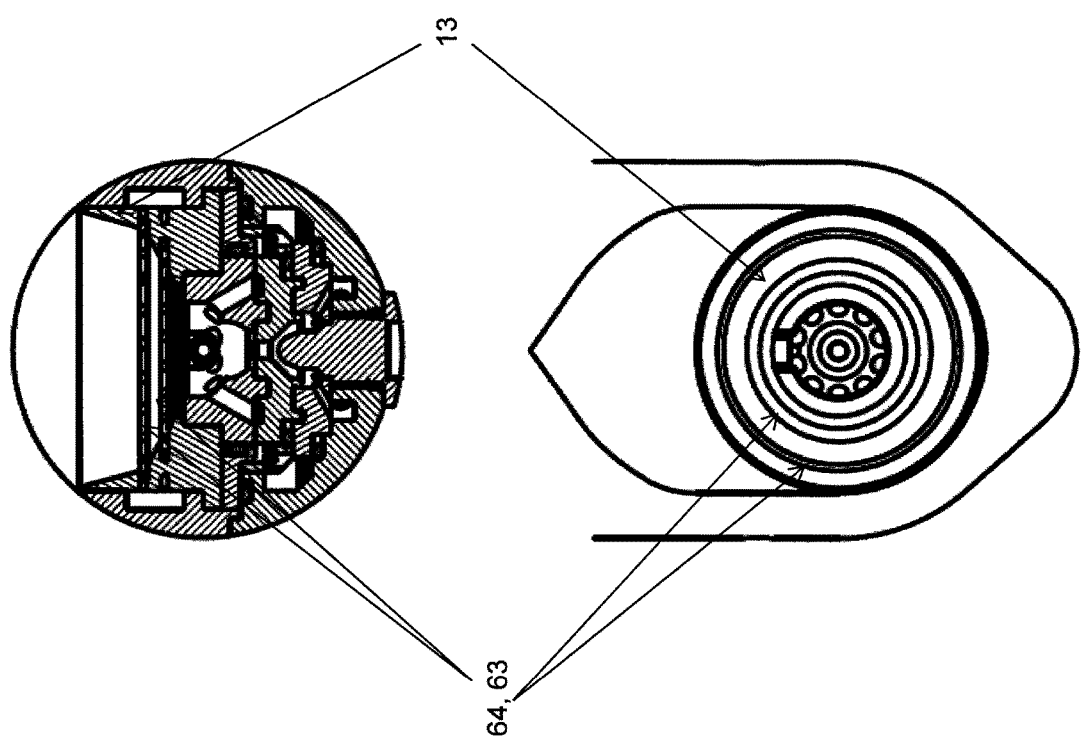

The nozzle ring 13 is of single-part construction, being embodied as a shielding gas nozzle with a slot 64 and holes 63 tangentially in a plurality of planes (FIG. 21).

Figure 22:
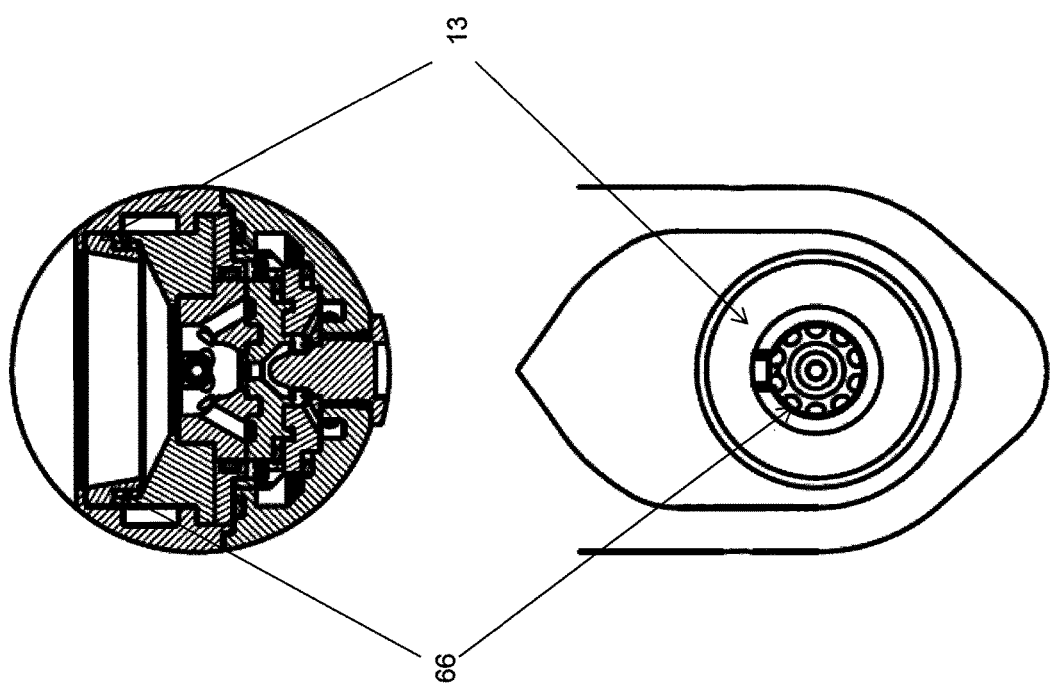

The nozzle ring 13 is of multipart construction, being embodied as a shielding gas nozzle with a slot 64 and tangential labyrinth holes 66 (FIG. 22).

It is advantageous if a shielding gas flow is introduced into the nozzle opening 77 in order to avoid and/or remove reflected and/or deflected particles, wherein the shielding gas flow is produced continuously and/or in a pulsed manner around the spray jet. The nozzle opening 77 is arranged in the flattened part of the housing 6, i.e. the main element 7 thereof, and is also defined by the surface 61 of the nozzle ring 13. The spring jet emerges from the nozzle opening 77.

To produce the shielding gas flow, the process gases can be used, all that is necessary being to divert them, and it is possible, in particular, to feed in the secondary gas as the shielding gas. It is also possible to supply other gases as process gases, e.g. air, argon or other gases. The shielding gas can flow through centrally arranged holes 63 and/or tangentially arranged holes 63 in one or more planes. Moreover, flow can take place through slotted nozzles 64 and/or slotted nozzles 64 with centrally and/or tangentially arranged holes 63 in one or more planes in order to stabilize said flow. Moreover, the shielding gas flow can take place through slotted nozzles 64 with a labyrinth 66 comprising centrally arranged holes/slots 63/64 and/or tangentially arranged holes/slots 63/64 in order to stabilize the shielding gas flow. The shielding gas forms as it were a protective shield to protect the surface 61, protecting the surface 61 of the nozzle ring 13, i.e. of the nozzle opening 77, from the deposition of said particles.

The nozzle insulator 14 (FIG. 10) is preferably formed from a ceramic material, and, although it is possible to dispense with a high-performance ceramic material, such a material can, of course, be used, exerting an electrically and thermally insulating effect between the housing 6/cathode 9 and the secondary gas nozzle 19. The nozzle insulator 14 is a separate component, although it can be omitted if its function is integrated into the main insulator 16. As a separate component, the nozzle insulator 14 resembles a spring ring in its design. The nozzle insulator 14 is fitted into the main insulator 16 (FIG. 12), and a corresponding circular segment 67 is left open in the region of the wire guide 18.

In an advantageous embodiment, the main insulator 16 (FIG. 11) is formed from a high-temperature plastic or from a ceramic material and provides thermal and electrical insulation between the housing 6/cathode 9 and the wire guide 18/wire 19. The main insulator 16 accommodates the wire guide 18, i.e. the components thereof, and centers them. The nozzle insulator 14 can be placed in the main insulator, as FIG. 12 shows by way of example.

Figure 12:
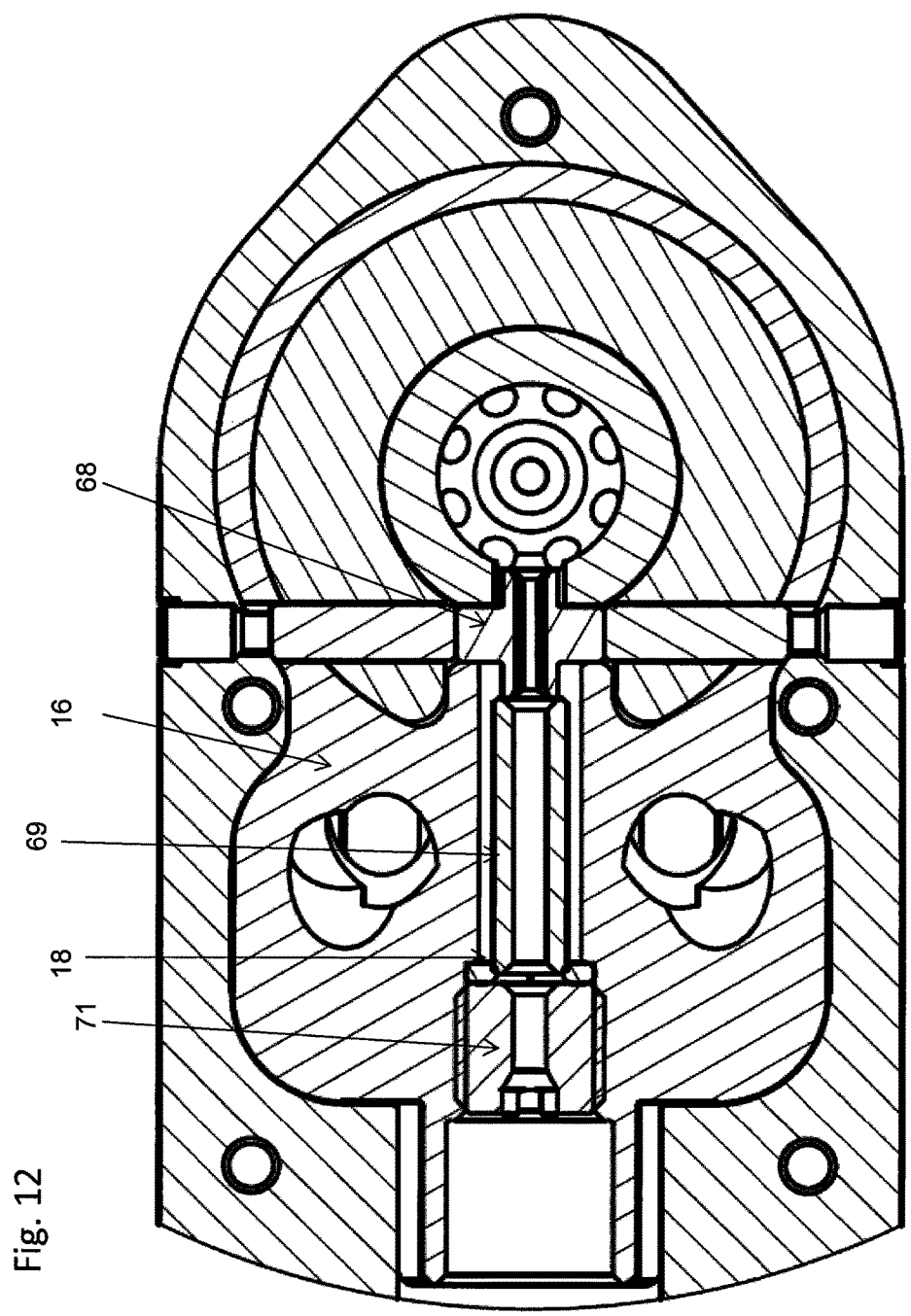
FIG. 12 shows a plan view of a longitudinal section from FIG. 2.
Figure 13:
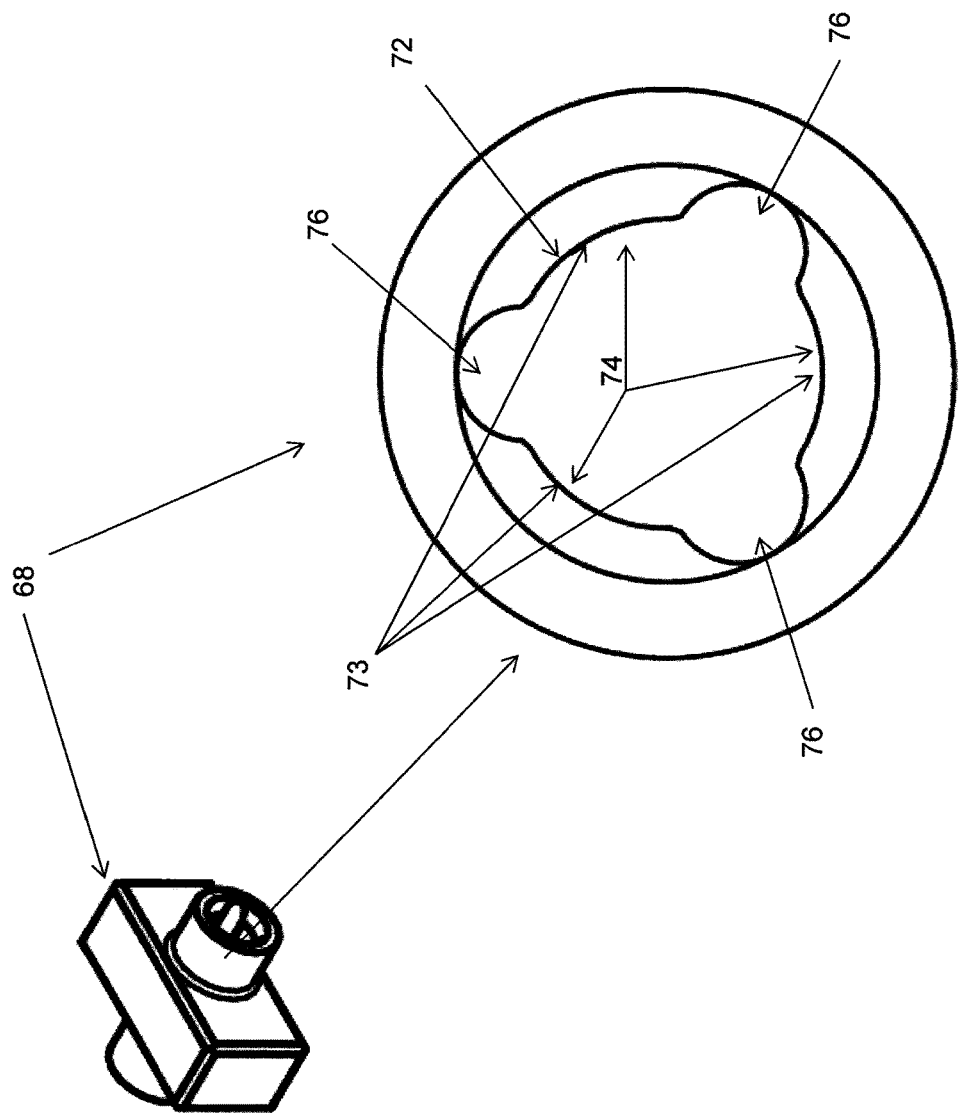
FIG. 13 shows a wire guide block as a detail, on the one hand in a perspective view and, on the other hand, in a cross section.

The wire guide 18 preferably has the components comprising the wire guide block 68, the wire guide tube 69 and the wire guide screw 71 (FIG. 12). In general, these components correspond to those in WO2012/95371, which is hereby incorporated in full by reference as regards the ability to adjust or straighten the wire into the axis of the cathode/primary gas nozzle/secondary gas nozzle. However, the wire guide block 68 (FIG. 13) has three-point support 73, visible in FIG. 3 by way of example, for the wire 17 on its inner circumference 73. This means that, within the wire guide block 68, the wire 17 has contact for guidance with the interior of the wire guide block 68 at three contact points 74, as viewed in the circumferential direction of the wire 17. Adjacent to each of the contact points 74, there are free spaces 76 introduced into the wire guide block 68, through which dirt particles adhering to the wire can be carried away. This is possible since the rotation and wire feed produce as it were an opposed delivery spiral. In the multipart wire guide 18, it is possible, by offsetting the wire guide block 68 relative to the wire guide screw 71 in the direction of the cathode-nozzle axis (X), to fix or adjust the angle of the wire guide axis relative to the cathode-nozzle axis. The wire guide axis is then no longer axial relative to the axis of rotation (Y) about which the device rotates and in the direction of which the wire guide screw 71 is situated. In the illustrative embodiment shown, the wire guide axis is congruent with the axis of rotation (Y), i.e. is not offset relative to the latter. To fix or adjust the particle jet angle, there is furthermore the possibility of changing the angle of the cathode-nozzle axis (X) relative to the axis of rotation (Y).

As already mentioned, the housing 6 is of two-part design by way of example, with the main element 7 and the cover element 8, and this is beneficial for ease of maintenance. As is apparent, the housing 6 is of predominantly round design. Only in the region of the nozzle opening 77 is the circular configuration of the housing 6, i.e. of the main element 7, as seen in cross section abandoned. Here, the housing 6 is flattened, wherein there is an oblique transition 78 to a plane 79 in which the nozzle ring 13 or nozzle opening 77 (FIG. 2) is arranged. The consistent retention of the circular housing 6 as seen in cross section avoids a blade effect, i.e. the process gases or air in a cylinder bore being taken along, thereby considerably reducing a negative influence of the blade effect on the particles to be transported in the direction of the surface to be coated. This flow-optimized surface configuration also has an effect in reducing deposits on the housing.

The cover element 8 can be screwed to the main element 7 to form the housing 6 by means of screws 81, wherein the secondary gas duct is arranged only in the main element 7 and thus cools the housing 6 on the side facing the process (dual function of the secondary gas, wherein, as mentioned, the primary gas also has a cooling function).

The invention provides a single-wire spring device 1 which rotates upon itself, by means of which even cylinder bores of relatively small diameter can be coated. The arc to be struck is struck directly between the cathode and the anode, i.e. on the wire, and not between the cathode and the plasma gas nozzle as hitherto known in the known devices, in which the service life was shortened by the effect of the arc, especially at relatively high current intensities. In the invention, the primary gas nozzle 21 is cooled by the secondary gas, for which reason the openings, i.e. slots 23, are provided. By means of the components comprising the nozzle insulator 14, the nozzle ring 13, the secondary gas nozzle 19, the primary gas distributor 11 and the secondary gas distributor 12, which are preferably formed from a ceramic material, an internal thermal and electrical insulation is as it were advantageously formed. The nozzle ring 13 is virtually the only external insulator in the otherwise metallic external form of the entire device or housing. The wire guide 18 with its components is accommodated completely within the housing 6, i.e. in the main element 7, making it possible to omit external protective measures. Sealing elements 83 can also be seen in FIG. 1.

LIST OF REFERENCE SIGNS

1 device for thermal coating
2 head part
3 connector
4 adapter
6 housing
7 main element
8 cover element
9 cathode
11 primary gas distributor
12 secondary gas distributor
13 nozzle ring
14 nozzle insulator
16 main insulator
18 wire guide
19 secondary gas nozzle
21 primary gas nozzle
22 side of 21 oriented toward 19

23 slots
24 side of 21 oriented toward 11
26 engagement element on 12
27 depression in 11
28 centering element on 22 of 21
29 counter centering elements on 19
31 side of 19 oriented toward 21
32 inlet region
33 secondary gas labyrinth
34 secondary gas holes in 19
36 core of 9
37 jacket of 9
38 sleeve portion
39 flange portion
41 key surface
42 O-ring
43 holes in 11
44 lower side of 11
46 side of 11 oriented toward 21
48 holes in 12
49 slot wall
51 assembly aid on 12
52 central opening in 19
53 wall portion
54 recess
56 outer ring of 13
57 central opening in 13
58 base flange
59 wall portion
61 outer surface
62 anti-adhesion and insulating layer
63 holes in 13
64 slot in 13
66 labyrinth holes
67 circular segment
68 wire guide block
69 wire guide tube
71 wire guide screw
72 inner circumference of 68
73 three-point support
74 contact points
76 free spaces
77 nozzle opening
78 oblique transition
79 plane
81 screws
83 sealing element

The invention claimed is:

1. A plasma nozzle comprising
a housing including:
  a cathode including a tungsten-alloyed core and a copper jacket including a sleeve portion accommodating the core and a flange including a key surface, the sleeve portion including an external thread screwing into a corresponding internal thread of the housing;
  a primary distributor of gas;
  a secondary distributor of gas; and
  a consumable wire anode; and
a wire guide guiding the consumable wire anode through the housing.

2. The plasma nozzle of claim 1, wherein the housing further includes a primary gas nozzle and a secondary gas nozzle mounted on the primary gas nozzle, the primary gas nozzle mounted in a centered manner on the primary distributor of gas and having openings arranged radially on its side oriented toward the secondary gas nozzle.

3. The plasma nozzle of claim 1, wherein the housing further includes a primary gas nozzle and a secondary gas nozzle mounted on the primary gas nozzle, the primary distributor of gas having depressions, the primary gas nozzle having engagement elements engaging in the depressions of the primary distributor of gas.

4. The plasma nozzle of claim 1, wherein the housing further includes a primary gas nozzle and a secondary gas nozzle mounted on the primary gas nozzle, the primary and secondary gas nozzles each having a number of openings.

5. The plasma nozzle of claim 1, wherein the housing further includes a primary gas nozzle, the primary distributor of gas having convergently and/or concentrically arranged apertures extending from a side opposing the primary gas nozzle toward a side adjacent the primary gas nozzle.

6. The plasma nozzle of claim 1, wherein the housing further includes a primary gas nozzle and a secondary gas nozzle mounted on the primary gas nozzle, the secondary gas nozzle having a wall portion surrounding a central opening having a recess for the wire, the secondary gas nozzle is closed opposite the recess in the delivery direction of the wire.

7. The plasma nozzle of claim 1, wherein the housing further includes a primary gas nozzle and a secondary gas nozzle mounted on the primary gas nozzle, the secondary gas nozzle having concentrically arranged apertures.

8. The plasma nozzle of claim 1, wherein the housing further includes an insulation nozzle ring formed from a material having a thermal conductivity of more than 80 W/mK.

9. The plasma nozzle of claim 1, wherein the housing further includes an insulation nozzle ring having a polished outer surface.

10. The plasma nozzle of claim 1, wherein the housing has a round cross section and has an obliquely extending transition to a plane only on a head part of the housing.

11. A plasma nozzle comprising
a housing including:
  a cathode;
  a primary distributor of gas;
  a secondary distributor of gas having convergently and/or concentrically arranged apertures having different diameters and including an assembly aid; and
  a consumable wire anode; and
a wire guide guiding the consumable wire anode through the housing.

12. The plasma nozzle of claim 11, wherein the housing further includes a primary gas nozzle and a secondary gas nozzle mounted on the primary gas nozzle.

13. The plasma nozzle of claim 12, wherein the primary gas nozzle is mounted in a centered manner on the primary distributor of gas.

14. The plasma nozzle of claim 12, wherein the primary gas nozzle has openings arranged radially on its side oriented toward the secondary gas nozzle.

15. A plasma nozzle comprising
a housing including:
  a cathode;
  a primary distributor of gas;
  a secondary distributor of gas; and
  a consumable wire anode; and
a wire guide guiding the consumable wire anode through the housing, the wire guide including a wire guide support of three contact points on its inner circumference and free spaces adjacent pairs of contact points, the three contact points configured to guide the wire through the housing.

16. The plasma nozzle of claim 15, wherein the housing further includes a primary gas nozzle and a secondary gas nozzle mounted on the primary gas nozzle.

17. The plasma nozzle of claim 16, wherein the primary gas nozzle is mounted in a centered manner on the primary distributor of gas.

18. The plasma nozzle of claim 16, wherein the primary gas nozzle has openings arranged radially on its side oriented toward the secondary gas nozzle.

* * * * *